United States Patent
Hwang et al.

(10) Patent No.: US 11,681,350 B2
(45) Date of Patent: Jun. 20, 2023

(54) DISPLAY DEVICE AND LUMINANCE CONTROL METHOD THEREOF AND MOBILE TERMINAL USING THE SAME

(71) Applicant: LG Display Co., Ltd., Seoul (KR)

(72) Inventors: Jong Hee Hwang, Paju-si (KR); Su Jin Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/371,803

(22) Filed: Jul. 9, 2021

(65) Prior Publication Data
US 2022/0051617 A1 Feb. 17, 2022

(30) Foreign Application Priority Data
Aug. 14, 2020 (KR) .................. 10-2020-0102139

(51) Int. Cl.
*G06F 1/3234* (2019.01)
*G06F 3/041* (2006.01)
*G09G 3/20* (2006.01)
*G09G 3/3225* (2016.01)
*G09G 3/3275* (2016.01)

(52) U.S. Cl.
CPC .......... *G06F 1/3265* (2013.01); *G06F 3/0416* (2013.01); *G09G 3/2007* (2013.01); *G09G 3/3225* (2013.01); *G09G 3/3275* (2013.01); *G09G 2310/027* (2013.01); *G09G 2320/043* (2013.01); *G09G 2320/0686* (2013.01); *G09G 2330/021* (2013.01); *G09G 2354/00* (2013.01)

(58) Field of Classification Search
CPC .... G06F 1/1626; G06F 1/1643; G06F 1/1694; G06F 1/3215; G06F 1/3218; G06F 1/3265; G06F 1/3296; G06F 3/0416; G06F 3/04817; G09G 3/2007; G09G 3/2092; G09G 3/3225; G09G 3/3233; G09G 3/3275; G09G 2310/027; G09G 2320/0233; G09G 2320/043; G09G 2320/0673; G09G 2320/0686; G09G 2330/021; G09G 2340/0407; G09G 2354/00; G09G 2360/16; Y02D 10/00
See application file for complete search history.

(56) References Cited

U.S. PATENT DOCUMENTS 5,491,332 A * 2/1996 Inbar .................. G06F 3/0425
250/221
8,766,953 B1 * 7/2014 Cheatham, III ...... G06F 3/0436
310/317

(Continued)

*Primary Examiner* — Julie Anne Watko
(74) *Attorney, Agent, or Firm* — Fenwick & West LLP

(57) ABSTRACT

The present disclosure relates to a display device, a luminance control method thereof, and a mobile terminal using the same. The display device includes a display panel in which a pixel array including at least a first pixel region and a second pixel region are disposed; a touch sensor disposed on the pixel array; a display panel driver configured to write pixel data of an input image to pixels in the first pixel region and the second pixel region; a touch sensor driver configured to drive the touch sensor and detect a touch input on the pixel array to generate touch coordinate data; and a luminance control device configured to lower the luminance of one of the first and second pixel regions in at least some gray scales when the touch input is detected on the pixel array.

9 Claims, 20 Drawing Sheets

(56) References Cited

U.S. PATENT DOCUMENTS

2015/0234540 A1* 8/2015 Sasaki .................. G02B 27/026
                                                        345/175
2017/0309216 A1* 10/2017 Jiao ...................... G09G 3/2007
2021/0318777 A1* 10/2021 Mao .................... G06F 3/04166

* cited by examiner

DISPLAY DEVICE AND LUMINANCE CONTROL METHOD THEREOF AND MOBILE TERMINAL USING THE SAME

CROSS-REFERENCE TO RELATED APPLICATION

This application claims priority to and the benefit of Republic of Korea Patent Application No. 10-2020-0102139, filed Aug. 14, 2020, the disclosure of which is hereby incorporated by reference in its entirety.

BACKGROUND

1. Field

The present disclosure relates to a display device capable of controlling luminance of a screen for each region, a luminance control method thereof, and a mobile terminal using the same.

2. Discussion of Related Art

An electroluminescent display device is roughly classified into an inorganic light emitting display device and an organic light emitting display device depending on the material of a light emitting layer. The organic light emitting display device of an active matrix type includes an organic light emitting diode (hereinafter referred to as "OLED") that emits light by itself (e.g., self-luminescent), and has an advantage that the response speed is fast, and the luminous efficiency, luminous and viewing angle are large. In the organic light emitting display device, an organic light emitting diode (OLED) is formed on each of the pixels. The organic light emitting display device has a high response speed, excellent luminous efficiency, luminous, viewing angle, and the like, and is capable of expressing black gradation in complete black, thereby providing excellent contrast ratio and color reproduction.

The multimedia capabilities of mobile terminals are improving. For example, a camera may be built into a smart phone, and the resolution of the camera is increasing to the level of a conventional digital camera. However, the front camera of a smart phone restricts the screen design, making it difficult to design the screen. In order to reduce the space occupied by the camera, a screen design including a notch or a punch hole has been adopted in smartphones, but the screen size is still limited due to the camera, and a full-screen display could have not been implemented.

SUMMARY

In order to implement a full-screen display, a sensing region in which low-resolution pixels may be disposed within a screen of a display panel may be provided. Since the number of pixels lighted in such a sensing region is relatively small, the uniformity of luminance of the entire screen may be driven by a relatively high voltage to the pixels in the sensing region. In this case, the deterioration of the pixels in the sensing region is accelerated compared to the pixels in the high-resolution region, so that the lifetime of the pixels may be shortened. In addition, power consumption may be different for each region of the screen, and a difference in power consumption may occur for each channel of the data driver.

The present disclosure provides a display device capable of implementing a full-screen display and improving the lifetime and power consumption of pixels, a luminance control method thereof, and a mobile terminal using the same.

It should be noted that objects of the present disclosure are not limited to the above-described objects, and other objects of the present disclosure will be apparent to those skilled in the art from the following descriptions.

According to an embodiment of the present disclosure, a display device may include: a display panel on which a pixel array including at least a first pixel region and a second pixel region are disposed; a touch sensor disposed on the pixel array; a display panel driver configured to write pixel data of an input image to pixels in the first pixel region and the second pixel region; a touch sensor driver configured to drive the touch sensor and detect a touch input on the pixel array to generate touch coordinate data; and a luminance control device configured to lower the luminance of one of the first and second pixel regions in at least some gray scales when the touch input is detected on the pixel array.

According to an embodiment of the present disclosure, a method for controlling luminance of a display device may include: writing pixel data of an input image to pixels in the first pixel region and the second pixel region; driving the touch sensor and detecting a touch input on the pixel array to generate touch coordinate data; and lowering the luminance of one of the first and second pixel regions when the touch input is detected on the pixel array.

According to an embodiment of the present disclosure, a mobile terminal may include the display device; a sensor configured to sense changes in movement and inclination in real time; a host system connected to the sensor and configured to transmit pixel data of an input image to the display panel driver, and to receive the touch coordinate data from the touch sensor driver; and a luminance control device configured to lower the luminance of one of the first and second pixel regions in at least some gray scales when the touch input is detected on the pixel array.

According to the present disclosure, since a sensor is disposed on a screen on which an image is displayed, a screen of a full-screen display may be implemented.

According to the present disclosure, it is possible to improve the lifetime of pixels in a low Pixels Per Inch (PPI) region in which a sensor is disposed and power consumption of a display device without deteriorating luminance felt by the user.

Effects of the present disclosure are not limited to the above-described effects, and other effects which are not mentioned can be apparently understood by those skilled in the art from a disclosure of claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
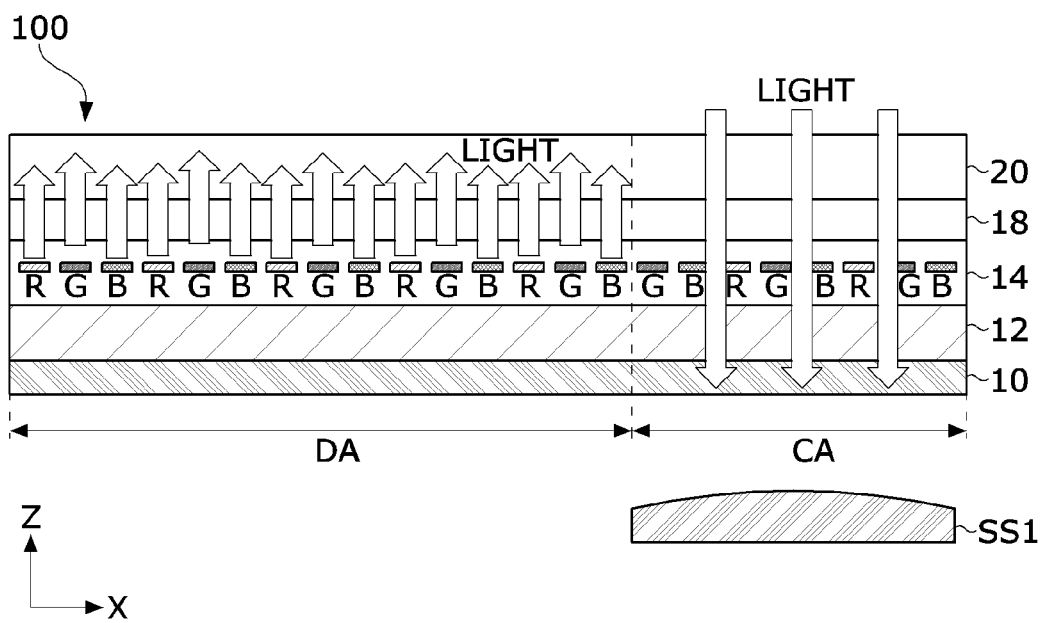
FIG. 1 is a schematic cross-sectional view of a display panel according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals refer to the same elements throughout the description.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

Figure 2:
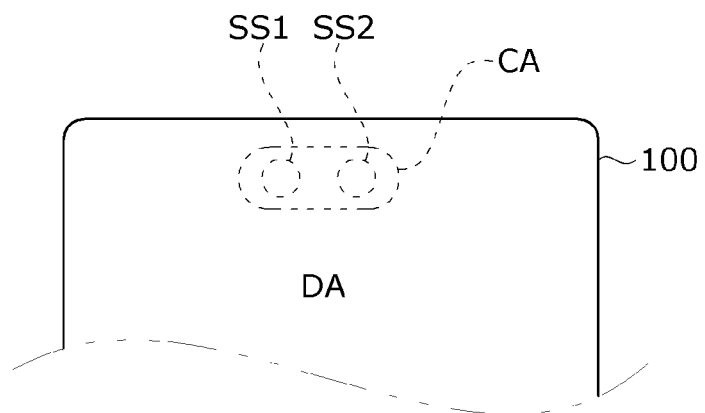
FIG. 2 is a plan view showing a part of a screen including a sensing region on a display panel according to an embodiment of the present disclosure.

Referring to FIGS. 1 and 2, the display panel 100 includes a screen for reproducing an input image. The screen may be divided into first pixel region DA and a second pixel region CA having different resolutions.

Each of the first pixel region DA and the second pixel region CA includes a pixel array in which pixels to which pixel data of an input image is written are disposed. The second pixel region CA may be a lower resolution pixel region than the first pixel region DA. The pixel array of the first pixel region DA may include pixels disposed with a high Pixels Per Inch (PPI). The pixel array of the second pixel region CA may include pixels disposed with a low PPI that is less than the high PPI.

As illustrated in FIG. 2, one or more sensor modules SS1 and SS2 facing the second pixel region CA may be disposed under the display panel 100. For example, various sensors such as an imaging module including an image sensor, an infrared sensor module, and an illuminance sensor module may be disposed under the second pixel region CA of the display panel 100. The second pixel region CA may include a light transmitting part to increase transmittance of light directed to the sensor module.

Since the first pixel region DA and the second pixel region CA include pixels, the input image may be displayed in the first pixel region DA and the second pixel region CA.

Each of the pixels in the first pixel region DA and the second pixel region CA includes sub-pixels having different colors to implement an image color. The sub-pixels include red (Red, hereinafter referred to as "R sub-pixel"), green (Green, hereinafter referred to as "G sub-pixel"), and blue (blue, hereinafter referred to as "B sub-pixel"). Although not shown, each of the pixels P may further include a white sub-pixel (hereinafter referred to as "W sub-pixel"). Each of the sub-pixels may include a pixel circuit driving a light emitting element.

An image quality compensation algorithm for compensating the luminance and color coordinates of pixels in the second pixel region CA having a lower PPI than the first pixel region CA may be applied.

In the display device of the present disclosure, since pixels are disposed in the second pixel region CA where the sensor is disposed, the display region of the screen is not limited due to an imaging module such as a camera. Accordingly, the display device of the present disclosure may implement a screen of a full-screen display.

The display panel 100 has a width in the X-axis direction, a length in the Y-axis direction, and a thickness in the Z-axis direction. The display panel 100 may include a circuit layer 12 disposed on a substrate and a light emitting element layer 14 disposed on the circuit layer 12. A polarizing plate 18 may be disposed on the light emitting element layer 14 and a cover glass 20 may be disposed on the polarizing plate 18.

The circuit layer 12 may include a pixel circuit connected to wirings such as data lines, gate lines, and power supply lines, a gate driver connected to the gate lines, and the like. The circuit layer 12 may include transistors implemented as a thin film transistor (TFT) and circuit elements such as a capacitor. The wiring and circuit elements of the circuit layer 12 may be implemented with a plurality of insulating layers, two or more metal layers separated with an insulating layer therebetween, and an active layer including a semiconductor material.

The light emitting element layer 14 may include a light emitting element driven by a pixel circuit. The light emitting element may be implemented as an OLED. The OLEDs include an organic compound layer formed between an anode and a cathode. The organic compound layer is a hole injection layer (HIL), a hole transport layer (HTL), an emission layer (EML), an electron transport layer (ETL), and an electron injection layer (EIL) may be included, but is not limited thereto. When a voltage is applied to the anode and cathode of the OLED, the holes passing through the hole transport layer (HTL) and the electrons passing through the electron transport layer (ETL) move to the emission layer (EML) to form excitons, and visible light is emitted from the emission layer (EML). The light emitting element layer 14 is disposed on pixels that selectively transmit red, green, and blue wavelengths, and may further include a color filter array.

The light emitting element layer 14 may be covered by a protective layer, and the protective layer may be covered by an encapsulation layer. The protective layer and the encapsulation layer may have a structure in which an organic film and an inorganic film are alternately stacked. The inorganic film blocks or at least reduces the penetration of moisture or oxygen. The organic film flattens the surface of the inorganic film. When the organic film and the inorganic film are stacked in multiple layers, the passage of moisture or oxygen is longer than that of a single layer, so that the penetration of moisture/oxygen affecting the light emitting element layer 14 may be effectively blocked or at least reduced.

The polarizing plate 18 may be adhered to the encapsulation layer. The polarizing plate 18 improves outdoor visibility of the display device. The polarizing plate 18 reduces light reflected from the surface of the display panel 100 and blocks light reflected from the metal of the circuit layer 12 to improve brightness of pixels. The polarizing plate 18 may be implemented as a linear polarizing plate and a polarizing plate or a circular polarizing plate in which a phase delay film is bonded.

Figure 3:
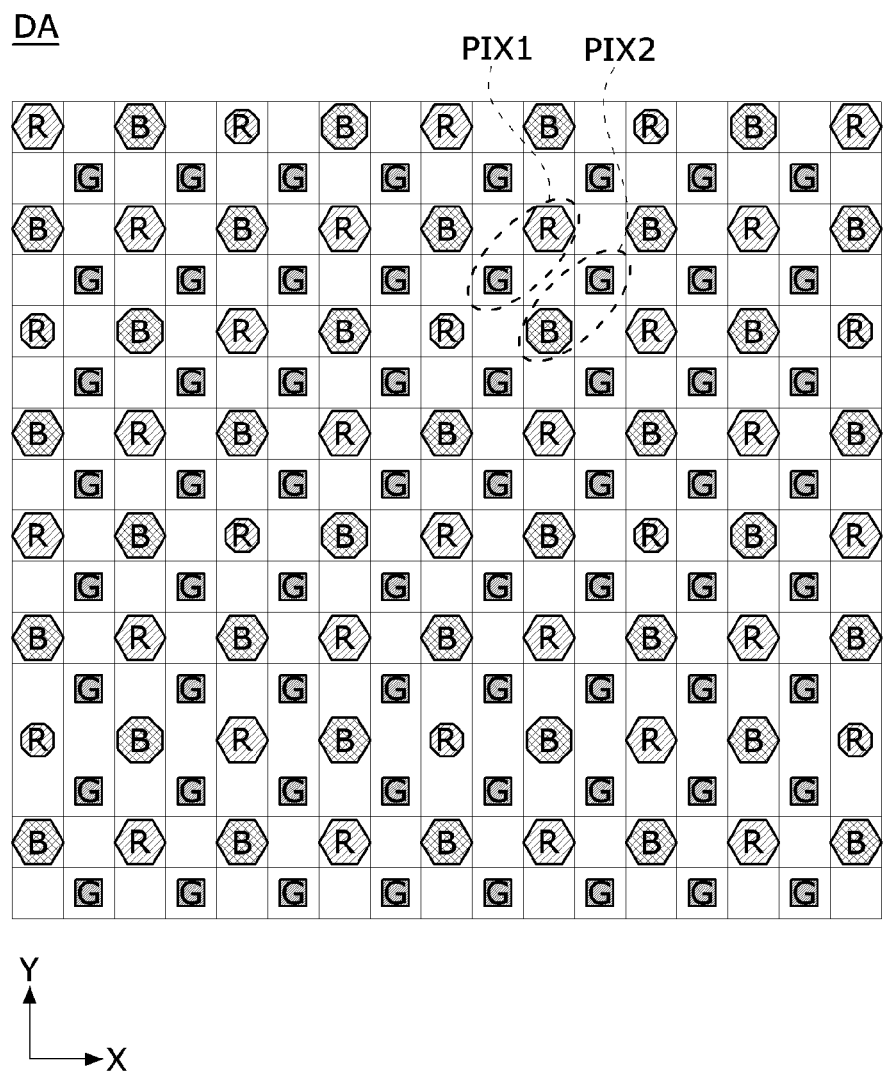
FIG. 3 is a diagram illustrating an example of a pixel arrangement in a display region according to an embodiment of the present disclosure.
Figure 4:
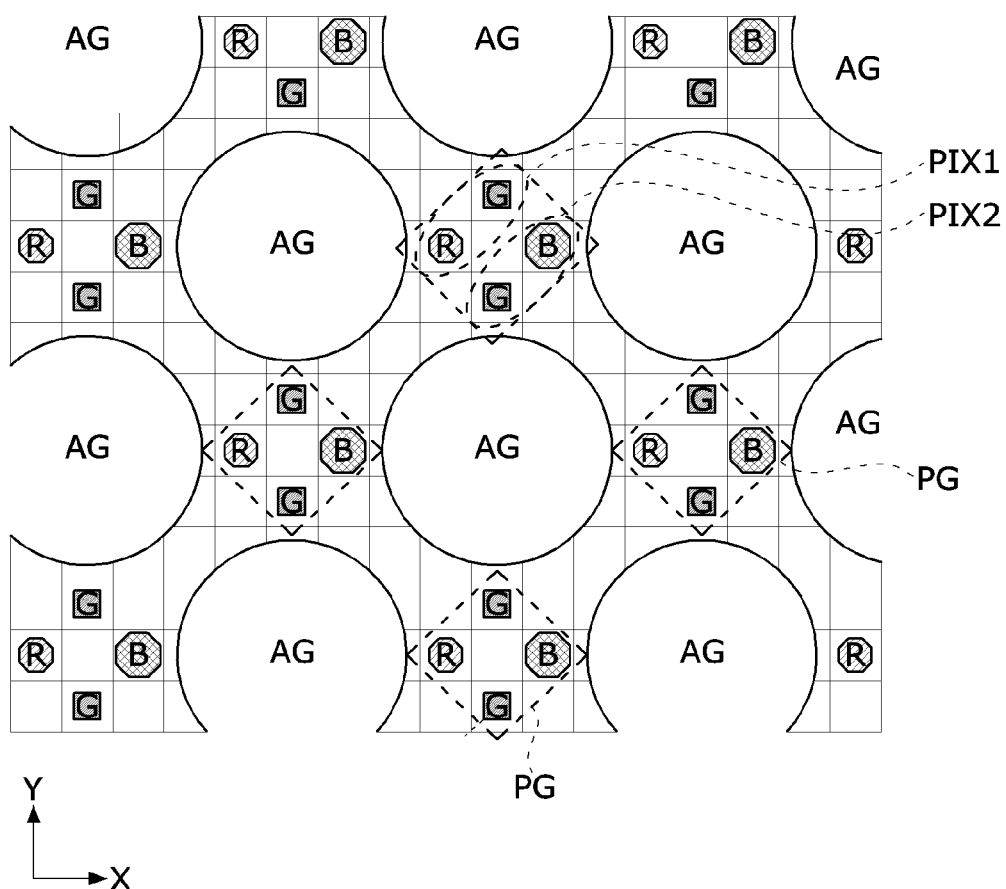
FIG. 4 is a diagram illustrating a pixel and a light transmitting part of an imaging region according to an embodiment of the present disclosure.

FIG. 3 is a diagram showing an example of a pixel arrangement of a first pixel region DA. FIG. 4 is a diagram showing an example of pixels and a light transmitting part of a second pixel region CA. In FIGS. 3 and 4, wirings connected to the pixels are omitted.

Referring to FIG. 3, the first pixel region DA includes pixels PIX1 and PIX2 arranged with a high PPI. Each of the pixels PIX1 and PIX2 may be implemented as a real type pixel in which R, G, and B sub-pixels of three primary colors are formed as one pixel. Each of the pixels PIX1 and PIX2 may further include a W sub-pixel omitted from the drawing. In addition, two sub-pixels may be configured as one pixel by using a sub-pixel rendering algorithm. For example, using a pixel rendering algorithm, the first pixel PIX1 may be composed of R and G sub-pixels, and the second pixel PIX2 may be composed of B and G sub-pixels. The pixel-rendering algorithm may compensate for an insufficient color expression in each of the pixels PIX1 and PIX2 with an average value of corresponding color data between neighboring pixels.

Referring to FIG. 4, the second pixel region CA includes a pixel group PG spaced apart by a predetermined distance and light transmitting parts AG disposed between neighboring pixel groups PG. The external light is received by the lens of the sensor module through light transmitting parts AG. The light transmitting parts AG may include transparent media having high transmittance without metal such that light may be incident with minimal light loss. In other words, the light transmitting parts AG may be made of transparent insulating materials without metal wiring or pixels. The PPI of the second pixel region CA becomes lower than that of the first pixel region DA due to the light transmitting parts AG.

The pixel group PG of the second pixel region CA may include one or two pixels. Each of the pixels of the pixel group may include two to four sub-pixels. For example, one pixel in the pixel group may include R, G, and B sub-pixels or may include two sub-pixels, and may further include W sub-pixels. In the example of FIG. 3, the first pixel PIX1 is composed of R and G sub-pixels, and the second pixel PIX2 is composed of B and G sub-pixels, but is not limited thereto.

The shape of the light transmitting parts AG is illustrated in a circular shape in FIG. 3, but is not limited thereto. For example, the light transmitting parts AG may be designed in various shapes, such as a circle, an oval, and a polygon.

Figure 5:
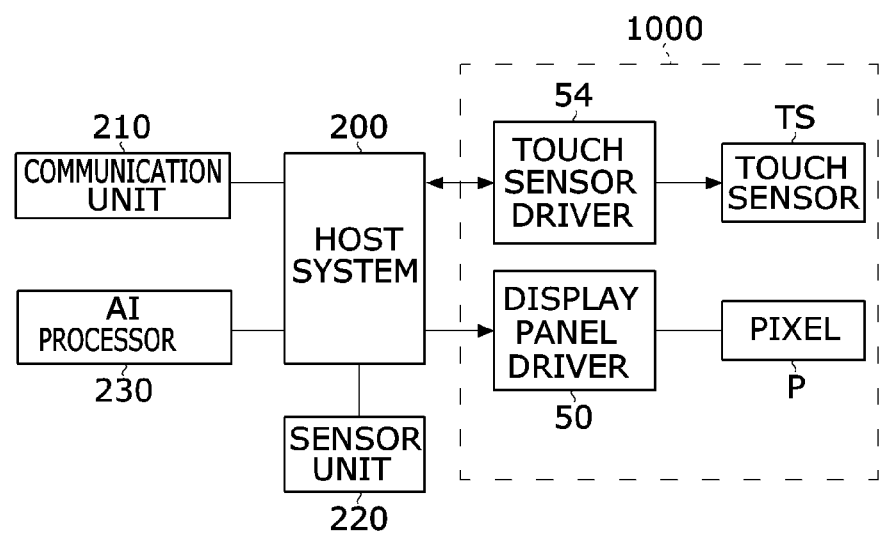
FIG. 5 is a block diagram schematically showing a mobile terminal according to an embodiment of the present disclosure.

FIG. 5 is a block diagram schematically showing a mobile terminal according to an embodiment of the present disclosure.

Referring to FIG. 5, the mobile terminal of the present disclosure includes a host system 200 and a display device 1000.

The display device 1000 includes a display panel in which pixels P are disposed on a screen, a display panel driver 50 for writing pixel data of an input image to the pixels P, touch sensors TS disposed on the screen of the display panel, a touch sensor driver 54 driving the touch sensors TS.

The display panel driver 50 may write pixel data to pixels using a timing controller, a data driver, and a gate driver.

The touch sensor driver 54 drives touch sensors disposed on the screen of the display panel, and outputs touch coordinate data, based on a change in capacity of the touch sensors. The touch coordinate data is transmitted to the host system 200 including location information of each touch input.

The host system 200 transmits pixel data of the input image to the display panel driver 50 through a graphic processor. The host system 200 executes a command or application associated with touch coordinate data input from the touch sensor driver 54.

The host system 200 may be connected to the communication unit 210, the sensor unit 220, the AI processor 230, and the like. The communication unit 210 may connect the host system 200 to a network such as the Internet by forming a wired/wireless communication link.

The sensor unit 220 may include various sensors required in a mobile terminal. For example, the sensor unit 220 may include an acceleration sensor and a gyro sensor to detect changes in movement and inclination of the mobile terminal in real time. The host system may activate luminance control data when the mobile terminal is rotated horizontally or inverted vertically in response to an output signal from the sensor unit 200.

The AI processor 220 provides data requested by the host system 200 based on a result of learning a neural network using a preset AI learning algorithm. The neural network may be designed to simulate a human brain structure on a computer, and may include a plurality of network nodes having weights simulating neurons of the human neural network. The plurality of network nodes may exchange data according to their respective connection relationships such that neurons may simulate synaptic activity of neurons that send and receive signals through synapses. The neural network may include a deep learning model developed from a neural network model.

The host system 200 or the touch sensor driver 54 may transmit region-specific luminance control data including touch input information of the second pixel region CA to the display panel driver 50. The host system 200 may transmit, to the display panel driver, region-specific luminance control data indicating an application in which a touch input frequently occurs in the second pixel region CA of the screen based on the learning result of the AI processor 220.

The display panel driver 50 may lower the luminance of one of the first and second pixel regions when the touch input is detected on the pixel array. For example, the display panel driver 50 lowers the luminance of the second pixel region CA when the second pixel region CA is frequently touched or a touch input of the second pixel region CA is expected in response to the region-specific luminance control data from the host system 200 or the touch sensor driver 54. As a result, the display panel driver 50 may extend the lifetime of the pixels in the second pixel region CA and reduce power consumption of the display device without deteriorating luminance felt by the user. When the touch input is frequently generated in the second pixel region CA, the user does not sensitively feel a decrease in luminance of the pixels because the pixels of the second pixel region CA are covered by a finger or a pen.

The host system 200 may rotate image data in association with the rotation direction of the mobile terminal when the mobile terminal is rotated horizontally or the position of the mobile terminal is inverted horizontally or vertically, based on the output signal of the sensor unit 210. If the position of the mobile terminal is inverted horizontally or vertically, the luminance of the second pixel region CA may be lowered when pixel data of low image quality such as a home button or a fixed icon is written in the second pixel region CA.

Figure 6:
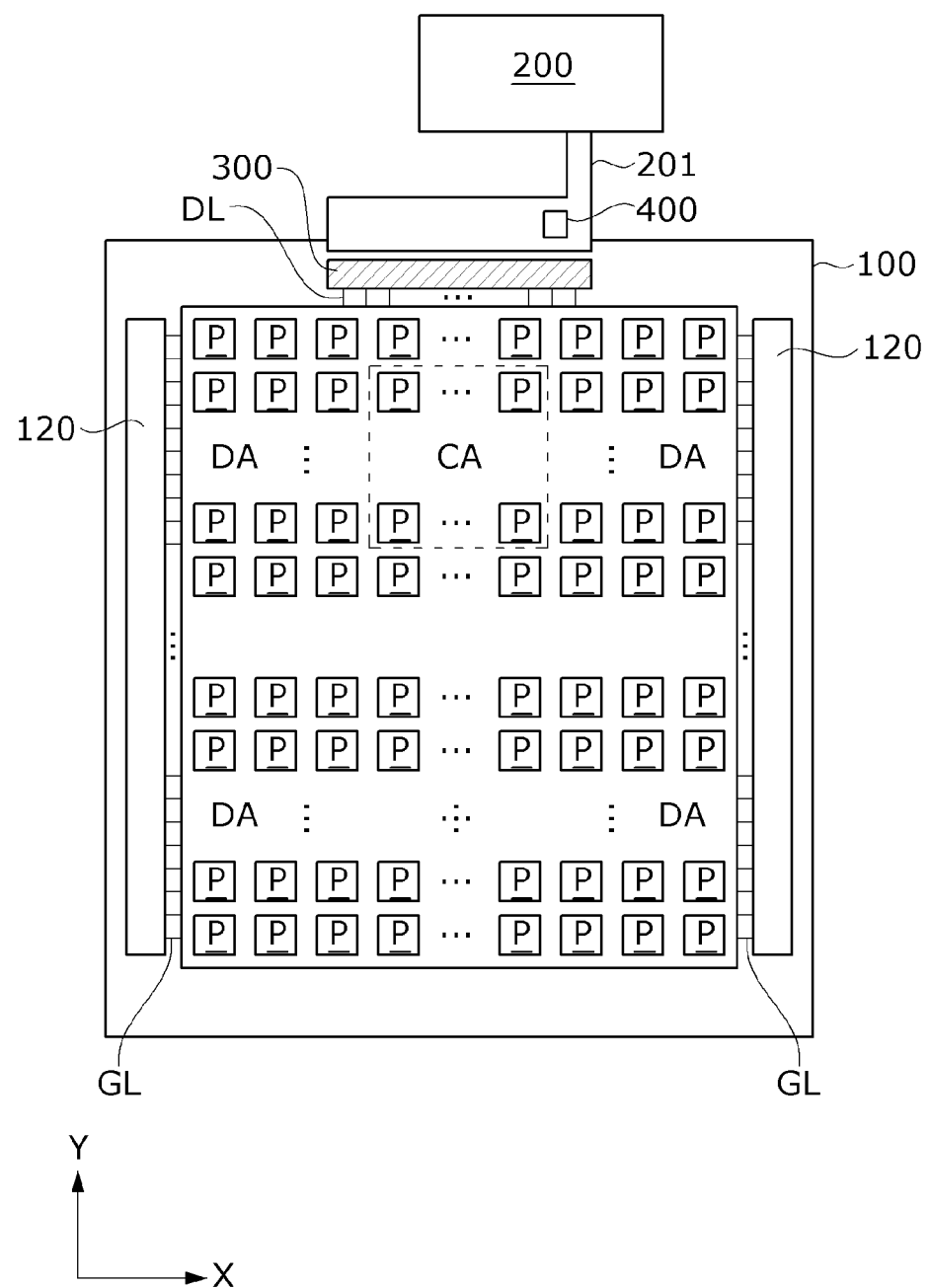
FIG. 6 is a block diagram showing a display panel and a display panel driver according to an embodiment of the present disclosure.
Figure 7:
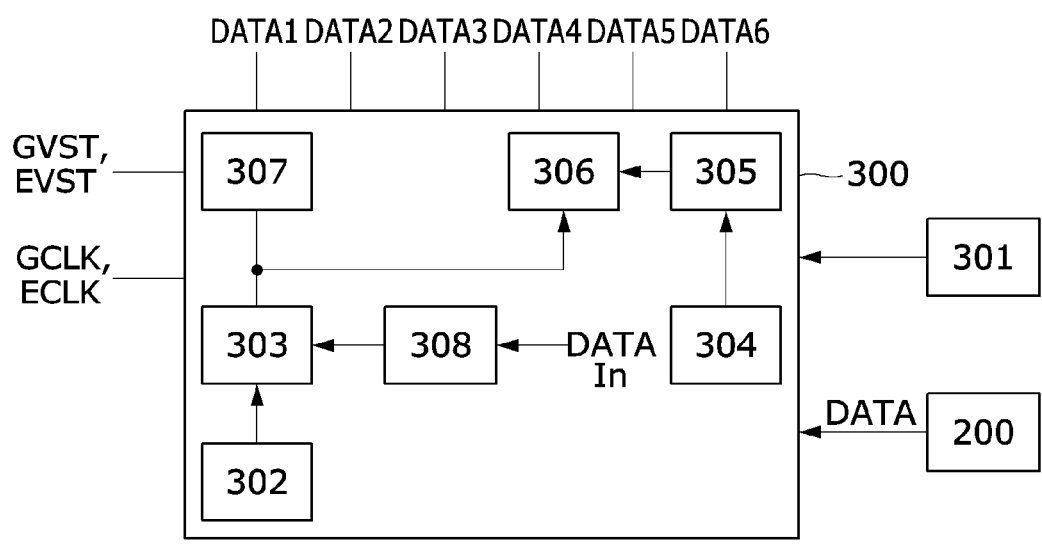
FIG. 7 is a block diagram schematically showing the configuration of a drive IC according to one embodiment.

FIG. 6 is a block diagram showing a display panel and a display panel driver according to an embodiment of the present disclosure. FIG. 7 is a block diagram schematically showing the configuration of a drive IC.

Referring to FIGS. 6 and 7, a screen on which an input image is reproduced on the display panel 100 includes pixel arrays of first and second pixel regions DA and CA.

The pixel array of the display panel 100 includes pixels P arranged in a matrix form defined by data lines DL, gate lines GL intersected with the data lines DL, and the data lines DL and the gate lines GL. The pixel array may further include power supply wirings such as VDD line PL1, Vini line PL2, and VSS line PL3 shown in FIG. 8.

The pixel array may be divided into a circuit layer 12 and a light emitting element layer 18 as shown in FIG. 1. Each of the pixels P may include two to four sub-pixels as described above. Each of the sub-pixels includes a pixel circuit disposed on the circuit layer 12. The pixel circuit may include a driving element that supplies current to the light emitting element, a plurality of switch elements that sample a threshold voltage of the driving element and switch a current path of the pixel circuit, a capacitor that maintains the gate voltage of the driving element, and the like. The pixel circuit may be disposed under the light emitting element.

Touch sensors may be disposed on the screen of the display panel. The touch sensors may be disposed on the screen of the display panel 100 in an On-cell type or an Add-on type, or an In-cell type touch sensor may be built into a pixel array. In the case of the Add-on type, the touch sensors may be disposed above the light emitting element layer 18. The touch sensor may be implemented as a capacitive type touch sensor, for example, a mutual capacitance sensor or a self-capacitance sensor. The self-capacitance is formed along single-layer conductor wiring formed in one direction. The mutual capacitance is formed between two orthogonal conductor wirings.

The display panel 100 may be implemented as a flexible panel applicable to a flexible display. In the flexible panel, the size of the screen may be varied and may be easily manufactured in various designs.

The display panel driver writes pixel data of the input image to the pixels P. The display panel driver includes a data driver 306 that supplies a data voltage of pixel data to the data lines DL, a gate driver 120 that sequentially supplies a gate pulse to the gate lines GL, and a timing controller 303 that controls the data driver 306 and the gate driver 120. The data driver 306 and the timing controller 303 may be integrated in the drive IC 300.

The touch sensor driver shown in FIG. 5 may be integrated in the touch IC 400 and connected to the drive IC 300 and the host system 200.

The touch IC 400 may include a sensing unit and a touch determination unit. The sensing unit may supply driving signals to the touch sensors through sensor lines omitted from the drawing to charge electric charge into the touch sensors, amplify and integrate the amount of the electric charge of the touch sensors. In addition, the sensing unit may convert the amount of the electric charge into digital data to sense the change in capacity before and after the touch input. To this end, the sensing unit includes an amplifier that amplifies the touch sensor signal, an integrator that accumulates the output voltage of the amplifier, and an analog-to-digital converter (hereinafter referred to as "ADC") that converts the voltage of the integrator into digital data, etc. The digital data output from the ADC is touch raw data indicating the change in capacity of the touch sensor before and after the touch input. The touch determination unit compares the touch raw data input from the sensing unit with a preset threshold, detects data higher than the threshold value, and generates touch coordinate data indicating the position of the touch sensor of the detected data. The touch determination unit may transmit the touch coordinate data to the host system 200 together with an identification code indicating each touch input.

The touch IC 400 may transmit the region-specific luminance control data indicating touch input information of the second pixel region CA to the drive IC 300.

The drive IC 300 may be adhered to the display panel 100. The drive IC 300 receives pixel data and timing signals of an input image from the host system 200, supplies a data voltage of the pixel data to the pixels, and synchronizes the data driver 306 and the gate driver 120.

The drive IC 300 is connected to the data lines DL through data output channels to supply a data voltage of pixel data to the data lines DL. The drive IC 300 may output a gate-timing signal for controlling the gate driver 120 through gate timing signal output channels. The gate timing signal generated from the timing controller 303 may include a start pulse (Gate start pulse, VST), a shift clock (Gate shift clock, CLK), and the like. The start pulse VST and the shift clock CLK swing between the gate-on voltage VGL and the gate-off voltage VGH. The gate timing signals VST and CLK output from the level shifter 307 are applied to the gate driver 120 to control the shift operation of the gate driver 120.

The gate driver 120 may include a shift register formed on a circuit layer of the display panel 100 together with a pixel array. The shift register of the gate driver 120 sequentially supplies gate signals to the gate lines GL under the control of the timing controller 303. The gate signal may include a scan pulse and an EM pulse of a light emitting signal. The shift register may include a scan driver outputting scan pulses and an EM driver outputting EM pulses. In FIG. 7, GVST and GCLK are gate-timing signals input to the scan driver. EVST and ECLK are gate-timing signals input to the EM driver.

The drive IC 300 may be connected to the host system 200, a first memory 301, and the display panel 100. The drive IC 300 may include a data calculating unit 308, a timing controller 303, a data driver 306, a gamma compensation voltage generating unit 305, a power supply unit 304, a second memory 302, and the like.

The data-calculating unit 308 includes a receiving unit that receives pixel data input as a digital signal from the host system 200 and a data processor that processes pixel data input through the receiving unit to improve image quality. The data processor may include a data-restoring unit that decodes and restores compressed pixel data, an optical compensation unit that adds a preset optical compensation value to the pixel data, and the like. The optical compensation value may be set as a value for correcting luminance of each pixel data based on luminance of a screen measured based on a camera image captured in a manufacturing process.

The timing controller 303 provides pixel data of an input image received from the host system 200 to the data driver 306. The timing controller 303 generates a gate-timing signal for controlling the gate driver 120 and a source-timing signal for controlling the data driver 306 to control the operation timing of the gate driver 120 and the data driver 306 and synchronizes the gate driver 120 and the data driver 306.

The data driver 306 converts digital data including pixel data received from the timing controller 303 through a digital to analog converter (hereinafter referred to as "DAC") into a gamma compensation voltage to output the data voltage. The data voltage output from the data driver 306 is supplied to the data lines DL of the pixel array through an output buffer connected to the data channel of the drive IC 300.

The gamma compensation voltage-generating unit 305 may divide gamma reference voltage from the power supply unit 304 through a divider circuit to generate a gamma compensation voltage for each gray scale. The gamma compensation voltage is an analog voltage whose voltage is set for each gray scale of pixel data. The gamma compensation voltage output from the gamma compensation voltage-generating unit 305 is provided to the data driver 306.

The power supply unit 304 generates power required for driving the pixel array of the display panel 100, the gate driver 120, and the drive IC 300 using a DC-DC converter. The DC-DC converter may include a charge pump, a regulator, a buck converter, a boost converter, and the like. The power supply unit 304 may adjust a DC input voltage from the host system 200 to generate provide a direct current power such as a gamma reference voltage, a gate-on voltage VGL, a gate-off voltage VGH, a pixel driving voltage VDD, a low-potential power supply voltage VSS, and an initialization voltage Vini. The gamma reference voltage is supplied to the gamma compensation voltage-generating unit 305. The gate-on voltage VGL and the gate-off voltage VGH are supplied to the level shifter 307 and the gate driver 120. The pixel power, such as the pixel driving voltage VDD, the low-potential power supply voltage VSS, and the initialization voltage Vini, is commonly supplied to the pixels P. The initialization voltage Vini is set to a DC voltage lower than the pixel driving voltage VDD and lower than the threshold voltage of the light emitting element OLED, so that the main nodes of the pixel circuits are initialized, and the light emission of the light emitting element OLED is suppressed.

The second memory 302 stores a compensation value, register setting data, and the like received from the first memory 301 when the power is input to the drive IC 300. The compensation value may be applied to various algorithms for improving the image quality. The compensation value may include an optical compensation value. The register setting data defines the operations of the data driver 306, the timing controller 303, the gamma compensation voltage-generating unit 305, and the like. The first memory 301 may include a flash memory. The second memory 302 may include static RAM (SRAM).

The host system 200 may be implemented as an application processor (AP). The host system 200 may transmit pixel data of an input image to the drive IC 300 through a video data interface such as a mobile industry processor interface (MIPI), a V-by-one, and a display port (DP). The host system 200 may be connected to the drive IC 300 through a flexible printed circuit (FPC), for example, a flexible printed circuit (FPC) 201. The touch IC 400 may be mounted on the FPC 201, but is not limited thereto.

The host system 200 or the touch IC 400 may transmit the region-specific luminance control data including touch input information of the second pixel region CA to the drive IC 300. In an image where a touch input is occurred frequently in the second pixel region CA or a touch input is expected to occur frequently in the second pixel region CA in response to the region-specific luminance control data, the drive IC 300 may control the luminance of the second pixel region CA to be lower than otherwise. In addition, in an image in which a touch input does not occur frequently or there is little touch input on the second pixel region CA, the drive IC 300 may vary the luminance reduction width according to the gray scale of the pixel data in order to extend the lifetime of the pixels while reducing image quality degradation.

The pixel circuit and the gate driver 120 may include a plurality of transistors. The transistors may be implemented as an oxide thin film transistor (TFT) including an oxide semiconductor, an LTPS TFT including a low temperature poly silicon (LTPS), or the like. Each of the transistors may be implemented as a p-channel TFT or an n-channel TFT. In the embodiment, an example in which the transistors of the pixel circuit are implemented as p-channel TFTs will be mainly described, but the present disclosure is not limited thereto.

The transistor is a three-electrode element including a gate, a source, and a drain. The source is an electrode that supplies a carrier to the transistor. In the transistor, the carrier starts flowing from the source. The drain is an electrode through which the carrier exits from the transistor. In the transistor, the flow of the carrier flows from the source to the drain. In the case of an n-channel transistor, since the carriers are electrons, the source voltage has a voltage lower than the drain voltage such that electrons may flow from the source to the drain. In the n-channel transistor, the direction of current is flowed from the drain to the source. In the case of the p-channel transistor PMOS, since the carriers are holes, the source voltage is higher than the drain voltage such that the holes may flow from the source to the drain. In the p-channel transistor, since the holes flow from the source to the drain, the current flows from the source to the drain. It should be noted that the source and drain of the transistor are not fixed. For example, the source and drain may be changed according to the applied voltage. Therefore, the present disclosure is not limited due to the source and drain of the transistor. In the following description, the source and drain of the transistor will be referred to as first and second electrodes.

The gate pulse swings between a gate on voltage and a gate off voltage. The gate-on voltage is set to a voltage higher than the threshold voltage of the transistor, and the gate-off voltage is set to a voltage lower than the threshold voltage of the transistor. The transistor is turned on in response to the gate-on voltage, while it is turned off in response to the gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

The driving element of the pixel circuit may be implemented as a transistor. It is preferable that the driving element has uniform electrical characteristics among all pixels, but due to process deviation and element characteristic deviation, the electrical characteristics may differ between the pixels and may change over the lapse of display driving time. In order to compensate for deviations in electrical characteristics of the driving element, the display device may include an internal compensation circuit and an external compensation circuit. The internal compensation circuit is added to the pixel circuit in each of the sub-pixels to sample the threshold voltage Vth and/or the mobility ($\mu$) of the driving element, which varies according to the electrical characteristics of the driving element, and compensates the change in real time. The external compensation circuit transmits the threshold voltage and/or mobility of the driving element sensed through a sensing line connected to each of the sub-pixels to an external compensation unit. The compensation unit of the external compensation circuit compensates for changes in electrical characteristics of the driving element by modulating pixel data of the input image by reflecting the sensing result. The voltage of the pixel varied according to the electrical characteristics of the driving element is sensed, the data of the input image is modulated in an external circuit based on the sensed voltage, thereby compensating for the electrical characteristic deviation of the driving element between the pixels.

Figure 8:
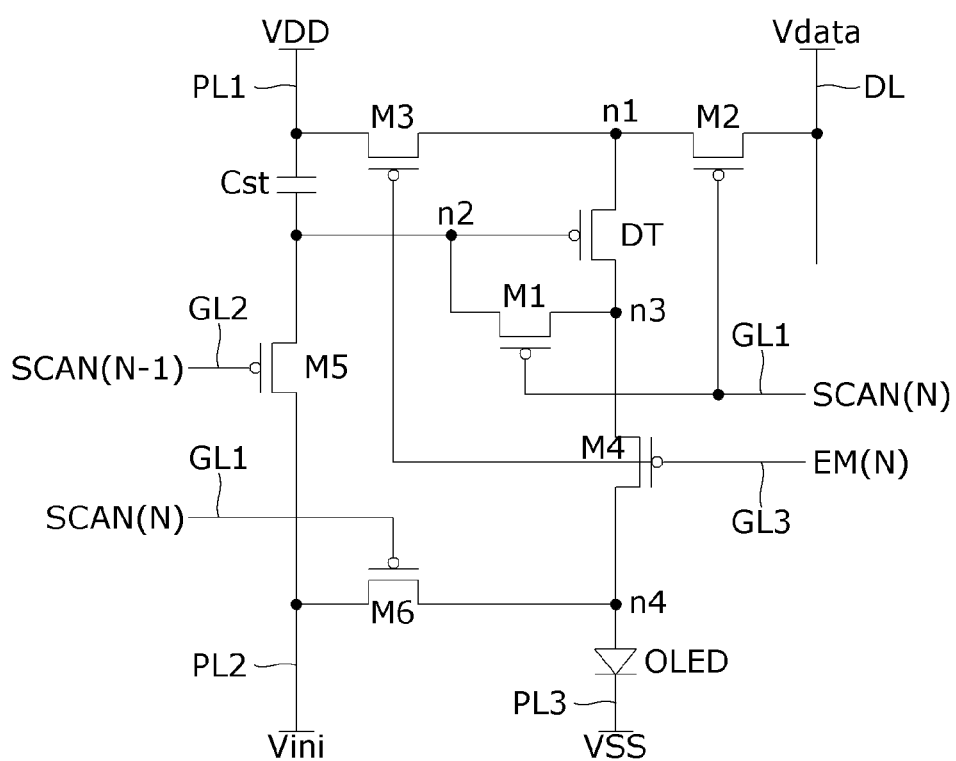
FIG. 8 is a circuit diagram showing an example of a pixel circuit according to one embodiment.
Figure 9:
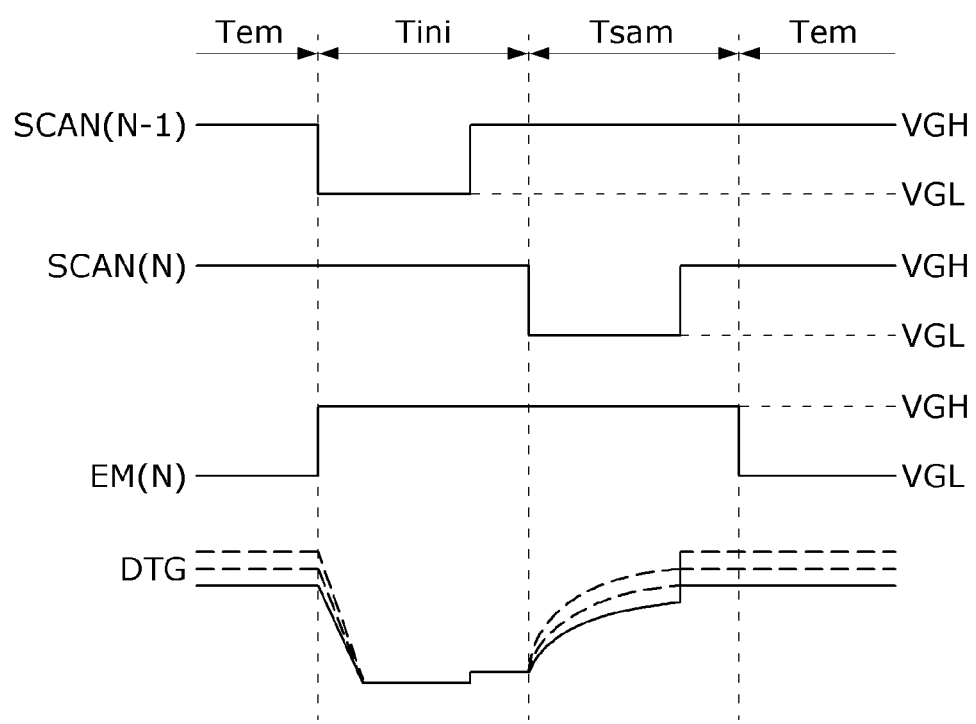
FIG. 9 is a diagram illustrating a method of driving the pixel circuit shown in FIG. 8 according to one embodiment.

FIG. 8 is a circuit diagram showing an example of a pixel circuit to which an internal compensation circuit is applied according to one embodiment. FIG. 9 is a diagram illustrating a method of driving the pixel circuit shown in FIG. 8 according to one embodiment. The pixel circuits shown in FIGS. 8 and 9 may be applied equally to the pixel circuits of the first pixel region DA and the second pixel region CA. The pixel circuit applicable to the present disclosure may be implemented with the circuit shown in FIG. 8, but is not limited thereto.

Referring to FIGS. 8 and 9, the pixel circuit may include a light emitting element OLED, a driving element DT supplying current to the light emitting element OLED, and an internal compensation circuit. In the internal compensation circuit, the threshold voltage Vth of the driving element DT is sampled using a capacitor Cst and a plurality of switch elements M1 to M6 and the gate voltage of the driving element DT is compensated by the threshold voltage Vth of the driving element DT. Each of the driving element DT and the switch elements M1 to M6 may be implemented as a p-channel TFT.

The driving period of the pixel circuit may be divided into an initialization period Tini, a sampling period Tsam, and a light emission period Tem as shown in FIG. 9.

During the initialization period Tini, the N−1th scan signal SCAN(N−1) is generated with a pulse of the gate-on voltage VGL, and each voltage of the Nth scan signal SCAN(N) and the light emitting signal EM(N) is a gate-off voltage VGH. During the sampling period Tsam, the Nth scan signal SCAN(N) is generated as a pulse of the gate-on voltage VGL, and each voltage of the N−1th scan signal SCAN(N−1) and the light emitting signal EM(N) is a gate-off voltage VGH. During at least a portion of the light emission period Tem, the light emitting signal EM(N) is generated as a gate-on voltage VGL, and each voltage of the N−1th scan signal SCAN(N−1) and the Nth scan signal SCAN(N) is the gate-off voltage VGH.

During the initialization period Tin, the fifth switch element M5 is turned on according to the gate-on voltage VGL of the N−1th scan signal SCAN(N−1) to initialize the pixel circuit. During the sampling period Tsam, the first and second switch elements M1 and M2 are turned on according to the gate-on voltage VGL of the N-th scan signal SCAN(N) so that the data voltage of the pixel data Vdata is applied to the gate of the driving element DT. In this case, the threshold voltage of the driving element DT is sampled, and the data voltage compensated by the threshold voltage is stored in the capacitor Cst. During the sampling period Tsam, the sixth switch element M6 is turned on to lower the voltage of the fourth node n4 to the initialization voltage Vini so that the light emission of the light emitting element OLED is suppressed. During the light emission period Tem, the third and fourth switch elements M3 and M4 are turned on so that light emitting element OLED is emitted. In order to accurately express the luminance of low gray scale with the duty ratio of the light emitting signal EM(N), during the light emission period Tem, the light emitting signal EM(N) may swing between the gate-on low voltage (VGL) and the gate-off voltage (VGH) at a predetermined duty ratio so that the third and fourth switch elements M1 and M2 may repeat on/off.

The light emitting element OLED may be implemented as an organic light emitting diode or an inorganic light emitting diode. Hereinafter, an example in which a light emitting element OLED is implemented as an organic light emitting diode will be described.

The light emitting element OLED may include an organic compound layer formed between the anode and the cathode. The organic compound layer may include, but is not limited to, a hole injection layer (HIL), a hole transport layer (HTL), an emission layer (EML), an electron transport layer (ETL), and an electron injection layer (EIL). When a voltage is applied to the anode and cathode electrodes of the OLED, holes that have passed through the hole transport layer (HTL) and electrons that have passed through the electron transport layer (ETL) are moved to the emission layer (EML), and excitons are formed, such that visible light is emitted from the emission layer (EML).

The anode electrode of the light emitting element OLED is connected to the fourth node n4 between the fourth and sixth switch elements M4 and M6. The fourth node n4 is connected to the anode of the light emitting element OLED, the second electrode of the fourth switch element M4, and the second electrode of the sixth switch element M6. The cathode electrode of the light emitting element OLED is connected to the VSS line PL3 to which the low potential power supply voltage VSS is applied. The light emitting element OLED emits light with a current Ids flowing according to the gate-source voltage Vgs of the driving element DT. The current path of the light emitting element OLED is switched by the third and fourth switch elements M3 and M4.

The capacitor Cst is connected between the VDD line PL1 and the first node n1. The data voltage Vdata compensated by the threshold voltage Vth of the driving element DT is charged in the capacitor Cst. Since the data voltage Vdata in each of the sub-pixels is compensated by the threshold voltage Vth of the driving element DT, deviation of the characteristics of the driving element DT is compensated for in the sub-pixels.

The first switch element M1 is turned on in response to the gate-on voltage VGL of the Nth scan pulse SCAN(N) to connect the second node n2 and the third node n3. The second node n2 is connected to the gate electrode of the driving element DT, the first electrode of the storage capacitor Cst, and the first electrode of the first switch element M1. The third node n3 is connected to the second electrode of the driving element DT, the second electrode of the first switch element M1, and the first electrode of the fourth switch element M4. The gate electrode of the first switch element M1 is connected to the first gate line GL1 to receive the Nth scan pulse SCAN(N). The first electrode of the first switch element M1 is connected to the second node n2, and the second electrode of the first switch element M1 is connected to the third node n3.

The second switch element M2 is turned on in response to the gate-on voltage VGL of the Nth scan pulse SCAN(N) to supply the data voltage Vdata to the first node n1. The gate electrode of the second switch element M2 is connected to the first gate line GL1 to receive the Nth scan pulse SCAN(N). The first electrode of the second switch element M2 is connected to the first node n1. The second electrode of the second switch element M2 is connected to the data line DL to which the data voltage Vdata is applied. The first node n1 is connected to the first electrode of the second switch element M2, the second electrode of the third switch element M2, and the first electrode of the driving element DT.

The third switch element M3 is turned on in response to the gate-on voltage VGL of the light emitting signal EM(N) to connect the VDD line PL1 to the first node n1. The gate electrode of the third switch element M3 is connected to the third gate line GL3 to receive the light emitting signal EM(N). The first electrode of the third switch element M3 is connected to the VDD line PL1. The second electrode of the third switch element M3 is connected to the first node n1.

The fourth switch element M4 is turned on in response to the gate-on voltage VGL of the light emitting signal EM(N) to connect the third node n3 to the anode of the light emitting element OLED. The gate electrode of the fourth switch element M4 is connected to the third gate line GL3 to receive a light emitting signal EM(N). The first electrode of the fourth switch element M4 is connected to the third node n3, and the second electrode is connected to the fourth node n4.

The fifth switch element M5 is turned on in response to the gate-on voltage VGL of the N−1th scan pulse SCAN(N−1) to connect the second node n2 to the Vini line PL2. The gate electrode of the fifth switch element M5 is connected to the second gate line GL2 to receive an N−1th scan pulse SCAN(N−1). The first electrode of the fifth switch element M5 is connected to the second node n2, and the second electrode is connected to the Vini line PL2.

The sixth switch element M6 is turned on in response to the gate-on voltage VGL of the Nth scan pulse SCAN(N) to connect the Vini line PL2 to the fourth node n4. The gate electrode of the sixth switch element M6 is connected to the first gate line GL1 to receive the Nth scan pulse SCAN(N). The first electrode of the sixth switch element M6 is connected to the Vini line PL2, and the second electrode is connected to the fourth node n4.

The driving element DT drives the light emitting element OLED by controlling the current Ids flowing through the light emitting element OLED according to the gate-source voltage Vgs. The driving element DT includes a gate connected to the second node n2, a first electrode connected to the first node n1, and a second electrode connected to the third node n3.

During the initialization period Tini, as shown in FIG. 9, the N−1th scan pulse SCAN(N−1) is generated as the gate-on voltage VGL. The Nth scan pulse SCAN(N) and the light emitting signal EM(N) maintain the gate-off voltage VGH during the initialization period Tini. Accordingly, the fifth switch element M5 is turned on during the initialization period Tini, so that the second and fourth nodes n2 and n4 are initialized to Vini. A hold period Th may be set between the initialization period Tini and the sampling period Tsam. In the hold period Th, the gate pulses SCAN(N−1), SCAN(N), and EM(N) maintain their previous state.

During the sampling period Tsam, the Nth scan pulse SCAN(N) is generated as the gate-on voltage VGL. The pulse of the Nth scan pulse SCAN(N) is synchronized with the data voltage Vdata of the Nth pixel line. The N−1th scan pulse SCAN(N−1) and the light emitting signal EM(N) maintain the gate-off voltage VGH during the sampling period Tsam. Accordingly, the first and second switch elements M1 and M2 are turned on during the sampling period Tsam.

During the sampling period Tsam, the gate voltage DTG of the driving element DT is increased by the current flowing through the first and second switch elements M1 and M2. When the driving element DT is turned off, the gate node voltage DTG is Vdata−|Vth|. In this case, the voltage of the first node n is also Vdata−|Vth|. During the sampling period Tsam, the gate-source voltage Vgs of the driving element DT is |Vgs|=Vdata−(Vdata−|Vth|)=|Vth|.

During the light emission period Tem, a light emitting signal EM(N) may be generated as the gate-on voltage VGL. During the light emission period Tem, the light emitting signal EM(N) is turned on/off at a predetermined duty ratio in order to improve expressiveness of the low gray scale, to swing between the gate-on voltage VGL and the gate-off voltage VGH. Accordingly, the light emitting signal EM(N) may be generated as the gate-on voltage VGL during at least a portion of the light emission period Tem.

When the light emitting signal EM(N) is the gate-on voltage VGL, the current flows through the driving element DT to the light emitting element OLED, so that the light emitting element OLED may emit light. During the light emission period Tem, the N−1th and Nth scan pulses SCAN (N−1) and SCAN(N) maintain the gate-off voltage VGH. During the light emission period Tem, the third and fourth switch elements M3 and M4 are turned on when the light emitting signal EM is the gate-on voltage VGL. The third and fourth switch elements M3 and M4 are turned on so that a current flows through the light emitting element OLED. In this case, Vgs of the driving element DT is |Vgs|=VDD−(Vdata−|Vth|), and the current flowing through the light emitting element OLED is $K(VDD-Vdata)^2$. K is a constant value determined by the charge mobility, parasitic capacitance, and channel capacity of the driving element DT.

Figure 10:
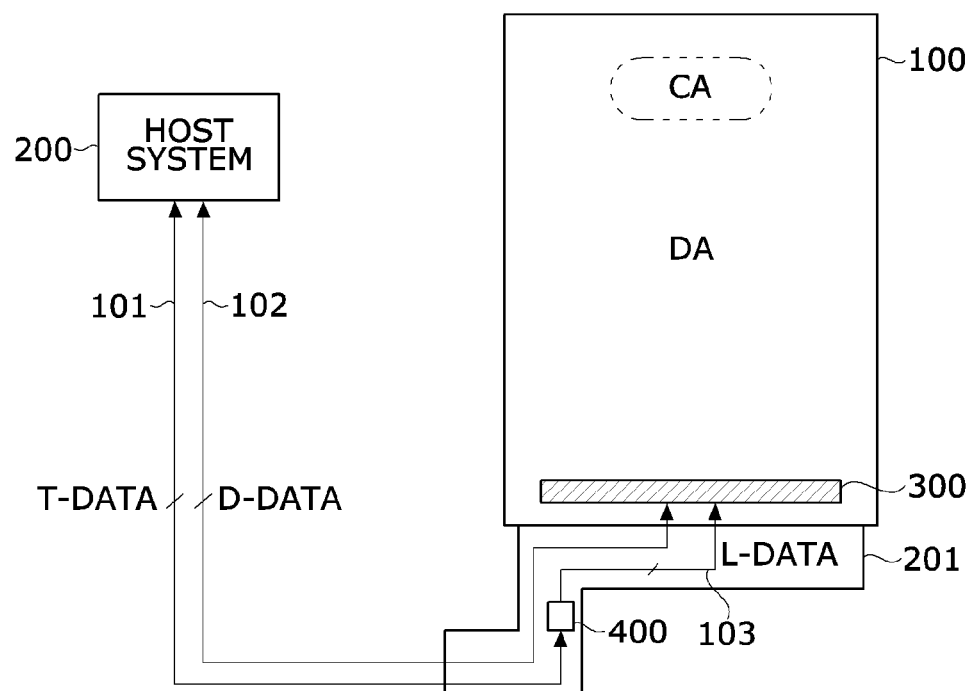
FIGS. 10 and 11 are views showing signal paths between a drive IC for driving a pixel, a touch IC for driving a touch sensor, and a host system in a mobile terminal according to an embodiment of the present disclosure.
Figure 11:
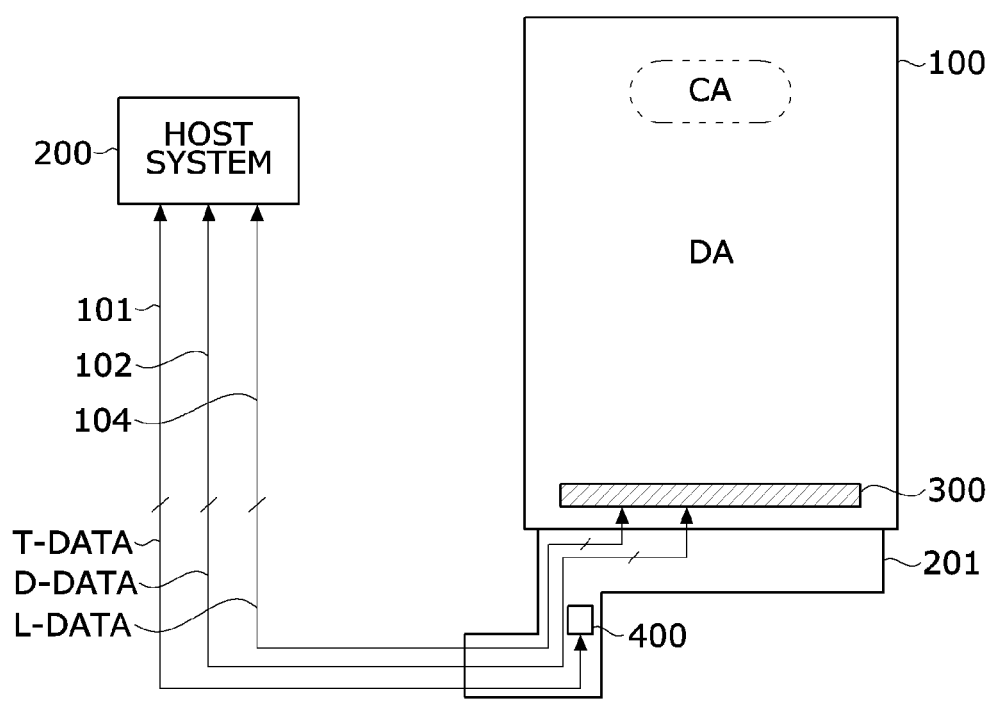

FIGS. 10 and 11 are diagrams showing signal paths between a drive IC for driving a pixel, a touch IC for driving a touch sensor, and a host system in a mobile terminal according to an embodiment of the present disclosure.

Referring to FIG. 10, the mobile terminal includes a first signal path 101 connecting the host system 200 and the touch IC 400, and a second signal path 102 connecting the host system 200 and the drive IC 300, and a third signal path 103 connecting the touch IC 400 and the drive IC 300.

The touch IC 400 transmits touch coordinate data T-DATA indicating the positions of each of the touch inputs detected on the screen of the display panel 100 through the first signal path 101 as a predetermined touch report rate (Hz) to the host system 200. The touch report rate is a frequency at which the touch coordinate data T-DATA is transmitted, and the faster the touch report rate, the faster the update speed of the touch coordinates. The first signal path 101 may transmit data T-DATA through a communication standard such as I2C or serial peripheral interface bus (SPI) through one or more wirings.

The host system 200 transmits pixel data of an input image to be written to the pixels of the display panel 100 to the drive IC 300 through the second signal path 102. The second signal path 102 may transmit data D-DATA in a display data communication standard such as a MIPI, V-by-one, or display port (DP) through one or more wirings.

The touch IC 400 may transmit the region-specific luminance control data L-DATA to the drive IC 300 through the third signal path 103. To this end, a General Purpose Input/Output (GPIO) pin to which the wiring of the third signal path 103 is connected may be added to the drive IC 300.

The luminance control data L-DATA may include touch coordinate data of the second pixel region CA. In addition, the luminance control data L-DATA may include touch input frequency data of the second pixel region CA. The frequency data is an accumulated value of the number of touch inputs within the reference time counted in the preset reference time unit in the second pixel region CA.

The touch IC 400 may transmit the luminance control data L-DATA including touch coordinate data and touch frequency data of the second pixel region CA to the drive IC 300. The drive IC 300 may compare the touch frequency data of the second pixel region CA with a preset threshold in response to the luminance control data L-DATGA received from the touch IC 400. Accordingly, the luminance of the second pixel region CA may be lowered when the number of touch inputs of the second pixel region CA is greater than or equal to the threshold value within the reference time. In this case, since the second pixel region CA is a second pixel region, the luminance of the second pixel region CA may be lowered even if the gray scale value of the pixel data to be written to the pixels of the second pixel region CA is not lowered. Since the second pixel region CA is a second pixel region, the luminance of the second pixel region CA may be lowered even if the data voltage of the pixel data to be written to the pixels of the second pixel region CA is not lowered. Meanwhile, in order to lower the luminance of the second pixel region CA, the pixel data to be written in the pixels of the second pixel region CA may be lowered to a value defined by a preset gamma curve (digital gamma correction). Alternatively, the data voltage Vdata to be applied to the pixels of the second pixel region CA may be lowered (analog gamma correction).

The reference time may be set to 1 second, and the threshold value may be 3 to 5, but is not limited thereto. Assuming 60 frames per second, the threshold at which the luminance of the second pixel region CA is adjusted to be low may be 0.05 to 0.08 times per frame. In this case, the drive IC 300 may lower the luminance of the second pixel region CA when the touch frequency of the second pixel region CA is 3 to 5 times or more per second.

The drive IC 300 may have the same luminance of the first and second pixel regions CA when the number of touch inputs to the second pixel region CA is less than the threshold value within the reference time. In this case, since the second pixel region CA is a second pixel region, the gray scale value of the pixel data to be written to the pixels of the second pixel region CA may be increased, or the data voltage Vdata to be applied to the pixels of the second pixel region CA may be increased.

In another embodiment, when the number of touch inputs of the second pixel region CA is less than a threshold value or no touch input is made within the reference time, the drive IC 300 may lower the luminance of a specific gray scale or greater in the second pixel region CA, in order to reduce a difference in image quality perceived by a user and reduce the lifetime of pixels, considering the gray scale characteristics of the image displayed in the second pixel region CA. In this case, since the second pixel region CA is a second pixel region, the drive IC 300 increases the gray scale value of the pixel data to be written to the pixels of the second pixel region CA or increases the data voltage Vdata to be applied to the pixels of the second pixel region CA in a gray scale range less than the specific gray scale. On the other hand, in order to lower the luminance of the second pixel region CA in a gray scale range equal to or greater than a specific gray scale, the drive IC 300 does not modulate the gray scale value of the pixel data to be written to the pixels or may lower the gray scale value of the pixel data. In addition, in order to lower the luminance of the second pixel region CA in a gray scale range equal to or greater than a specific gray scale, the drive IC 300 may output the data voltage Vdata to be applied to the pixels of the second pixel region CA as the same voltage as the first pixel region DA at the same gray scale, or may lower to the voltage corresponding to the luminance defined by the gamma curve.

The specific gray scale may be varied based on a result of analyzing pixel data to be written in pixels of the second pixel region CA in the input image. For example, the drive IC 300 may analyze the gray scale distribution of the second pixel region CA for each frame period and select a gray scale value representing the gray scale characteristics of the frame data. The drive IC 300 may store frame data in a memory using a histogram analysis method, and accumulate pixel data for each gray scale from the frame data, such thin the gray scale value with the largest accumulated value, that is, the gray scale value of the maximum frequency may be selected as a specific gray scale.

In another embodiment, the touch IC 400 may compare the touch frequency data of the second pixel region CA with a preset threshold. If the number of touch inputs of the second pixel region CA within a reference time is greater than or equal to the threshold value, the region-specific luminance control data L-DATA having an activation code value for lowering luminance of the second pixel region CA may be transmitted to the drive IC 300. The drive IC 300 may lower the luminance of the second pixel region CA in response to the luminance control data L-DATGA having an activation code value.

The touch IC 400 may transmit the region-specific luminance control data L-DATA having a deactivation code value to the drive IC 300 when the number of touch inputs of the second pixel region CA within the reference time is less than the threshold value. The drive IC 300 may equalize the luminance of the first and second pixel regions CA in response to the luminance control data L-DATGA having a deactivation code value.

In another embodiment, the drive IC 300 may lower luminance of a specific gray scale or greater in the second pixel region CA in order to reduce a difference in image quality perceived by a user and reduce the lifetime of pixels in response to the luminance control data L-DATGA having a deactivation code value.

The region-specific luminance control data L-DATA may be transmitted to the drive IC 300 through the third signal path 103. To this end, a general purpose input/output (GPIO) pin to which the wiring of the third signal path 103 is connected may be added to the drive IC 300.

Referring to FIG. 11, the mobile terminal includes a first signal path 101 connecting the host system 200 and the touch IC 400, and the second and third signal paths 102 and 104 connecting the host system 200 and the drive IC 300.

The touch IC 400 transmits touch coordinate data T-DATA indicating the positions of each of the touch inputs detected on the screen of the display panel 100 through the first signal path 101 as a predetermined touch report rate (Hz) to the host system 200. The host system 200 transmits pixel data of an input image to be written to the pixels of the display panel 100 to the drive IC 300 through the second signal path 102.

The host system 200 may transmit the region-specific luminance control data L-DATA to the drive IC 300 through the third signal path 104. To this end, the GPIO pin to which the wiring of the third signal path 104 is connected may be added to the drive IC 300.

The host system 200 may count the touch coordinate data received from the touch IC 400 in a preset reference time unit and generate the accumulated touch frequency within the reference time every reference time. The host system 200 may transmit the region-specific luminance control data L-DATA to the drive IC 300. The luminance control data L-DATA may include touch coordinate data of the second pixel region CA. In addition, the luminance control data L-DATA may include touch input frequency data of the second pixel region CA. The frequency data is an accumulated value of the number of touch inputs counted within the preset reference time in the second pixel region CA. The drive IC 300 may compare the touch frequency data of the second pixel region CA with a preset threshold in response to the luminance control data L-DATGA received from the touch IC 400. In addition, the drive IC 300 may lower the luminance of the second pixel region CA when the number of touch inputs to the second pixel region CA is greater than or equal to the threshold value within the reference time.

The drive IC 300 may have the same luminance of the first and second pixel regions CA when the number of touch inputs of the second pixel region CA is less than the threshold value within the reference time.

In another embodiment, when the number of touch inputs of the second pixel region CA is less than a threshold value or no touch input is made within the reference time, the drive IC 300 may lower the luminance of a specific gray scale or greater in the second pixel region CA, in order to reduce a difference in image quality perceived by a user and reduce the lifetime of pixels, considering the gray scale characteristics of the image displayed in the second pixel region CA.

The host system 200 may compare the touch frequency data of the second pixel region CA with a preset threshold, and may output the region-specific luminance control data (L-DATA) having an activation code value for lowering luminance when the number of touch inputs of the second pixel region CA exceeds a threshold value within a reference time, the second pixel region CA. In this case, the drive IC 300 lowers the luminance of the second pixel region CA in response to the luminance control data L-DATA having an activation code value.

The host system 200 may generate the region-specific luminance control data L-DATA as a preset deactivation code value when the number of touch inputs of the second pixel region CA is less than a threshold value within a reference time.

The host system 200 may transmit luminance control data L-DATA having an activation code value to the drive IC 300 in order to lower the luminance of the second pixel region CA when an application in which a touch input of the second pixel region CA is frequently generated, for example, a game application is executed. In addition, the host system 200 may analyze the learning result of the AI processor and estimate whether a touch input occurs frequently in the second pixel region CA, and transmit the luminance control data L-DATA having an activation code value to the drive IC 300 in order to lower the luminance of the second pixel region CA when pixel data of an image having a high touch input probability of the second pixel region CA is output.

The drive IC 300 may equalize luminance of the first and second pixel regions DA and CA in response to the region-specific luminance control data L-DATA having a deactivation code value.

In another embodiment, the drive IC 300 may lower the luminance of a specific gray scale or greater in order to reduce a difference in image quality perceived by a user and reduce the lifetime of pixels in response to the luminance control data L-DATGA having a deactivation code value.

Figure 12:
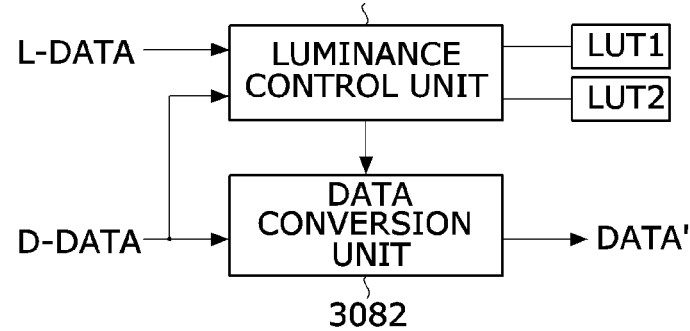
FIG. 12 is a diagram showing a luminance control device using digital gamma compensation technology according to one embodiment.

FIG. 12 is a diagram showing a luminance control device using digital gamma compensation technology according to one embodiment. This luminance control device may be included in the data-calculating unit 308 shown in FIG. 5 in one embodiment.

Referring to FIG. 12, the luminance control device includes a luminance control unit 3081 and a data conversion unit 3082.

The luminance control unit 3081 adjusts the luminance of the second pixel region CA in response to the region-specific luminance control data L-DATA. For example, the luminance control unit 3081 lowers the luminance of the second pixel region CA when it is determined that the frequency of the touch input on the second pixel region CA is greater than or equal to the threshold value, or when it is determined as pixel data of an image in which a touch input may occur in the second pixel region.

The luminance control unit 3081 may be connected to a plurality of look-up tables LUTs in which a gamma curve defining luminance for each gray scale of the second pixel region CA is set. For example, in the first lookup table LUT1, a gamma curve defining luminance of the second pixel region CA may be set with the same luminance as the first pixel region DC for each gray scale. In the second lookup table LUT2, a gamma curve defining luminance of the second pixel region CA may be set to have a luminance lower than that of the first pixel region DC in at least some gray scales.

The luminance control unit 3081 selects a luminance value corresponding to the gray scale of the input pixel data from the first lookup table LUT1 when the luminance of the second pixel region CA is controlled to the same luminance as the first pixel region DA. The luminance control unit 3081 selects a luminance value corresponding to the gray scale of the input pixel data from the second lookup table LUT2 when the luminance of the second pixel region CA is controlled to a lower luminance than the first pixel region DA. The luminance control unit 3081 may convert the luminance selected from the lookup tables LUT1 and LUT2 into a gray scale value, or convert it into a gray scale value using a luminance-gray scale conversion table to provide it to the data conversion unit 3082.

The data conversion unit 3082 modulates the input pixel data into a gray scale value input from the luminance control unit 3081. The pixel data DATA' modulated by the data conversion unit 3082 is transmitted to the data driver 305.

Figure 13:
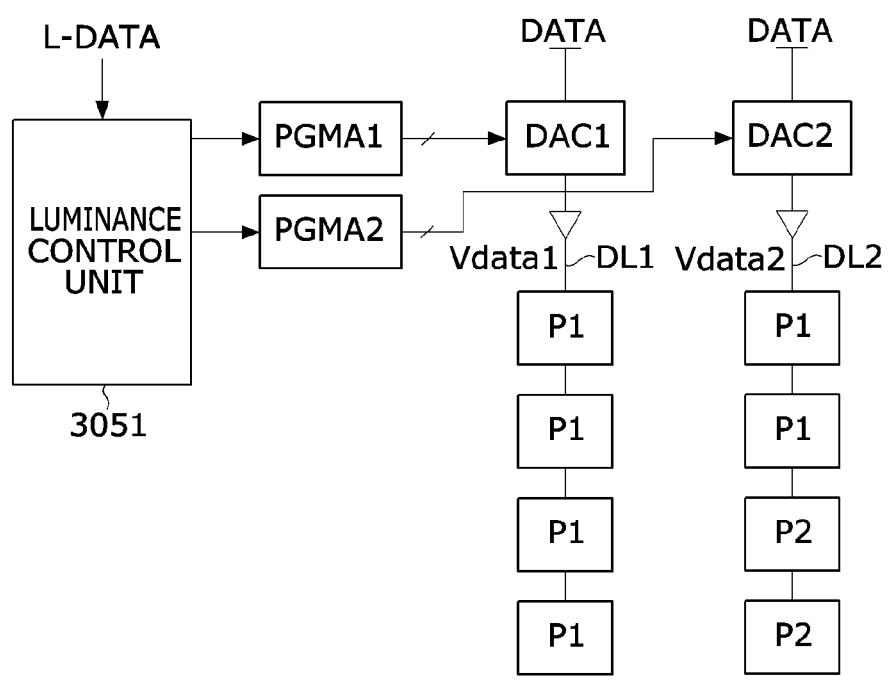
FIG. 13 is a diagram showing a luminance control device using an analog gamma compensation technology according to one embodiment.

FIG. 13 is a diagram showing a luminance control device using analog gamma compensation technology according to one embodiment.

Referring to FIG. 13, the data driver 305 includes a plurality of first DACs DAC1 supplying a data voltage Vdata1 to pixels P1 of a first pixel region DA, and a plurality of second DACs DAC2 supplying the data voltage Vdata2 to the pixels P2 of the second DA.

The first DAC DAC1 converts the pixel data DATA to be written to the pixels of the first pixel region DA into a gamma compensation voltage for each gray scale from a first gamma compensation voltage generating unit PGAM1. A first data line DL1 connected to the first DAC DAC1 is connected to the pixels P1 of the first pixel region DA. Accordingly, the data voltage Vdata1 output from the first DAC DAC1 is applied to the pixels P1 of the first pixel region DA through an output buffer and the data line DL1.

The second DAC DAC2 converts the pixel data DATA to be written to the pixels P1 and P2 of the first and second pixel regions DA and CA to gamma compensation voltage for each gray scale from a second gamma compensation voltage-generating unit PGAM2. The data line DL2 connected to the second DAC DAC2 is connected to the pixels P1 of the first pixel region DA and the pixels P2 of the second pixel region CA. Accordingly, the data voltage Vdata2 output from the second DAC DAC2 is applied to the pixels P1 of the first pixel region DA and the pixels P2 of the second pixel region CA through the output buffer and the data line DL2.

The power supply unit 3050 illustrated in FIG. 2 includes a luminance control unit 3051 and first and second gamma compensation voltage generating units PGMA1 and PGMA2.

Each of the first and second gamma compensation voltage generating units PGMA1 and PGMA2 is implemented as a programmable gamma compensation voltage generating circuit. In the programmable gamma compensation voltage generation circuit, the level of the output voltage may be varied according to luminance data input from the luminance control unit 3051.

The luminance control unit 3051 may output luminance data corresponding to the voltage defined in the gamma curve defining luminance of the first pixel region DA, and output luminance data corresponding to the voltage defined in the gamma curve defining luminance of the second pixel region CA. The luminance control unit 3051 may vary the luminance data in response to region-specific luminance control data L-DATA to change the voltage level of the gamma compensation voltage output from the DACs DAC1 and DAC2 for each region of the screen.

Figure 14:
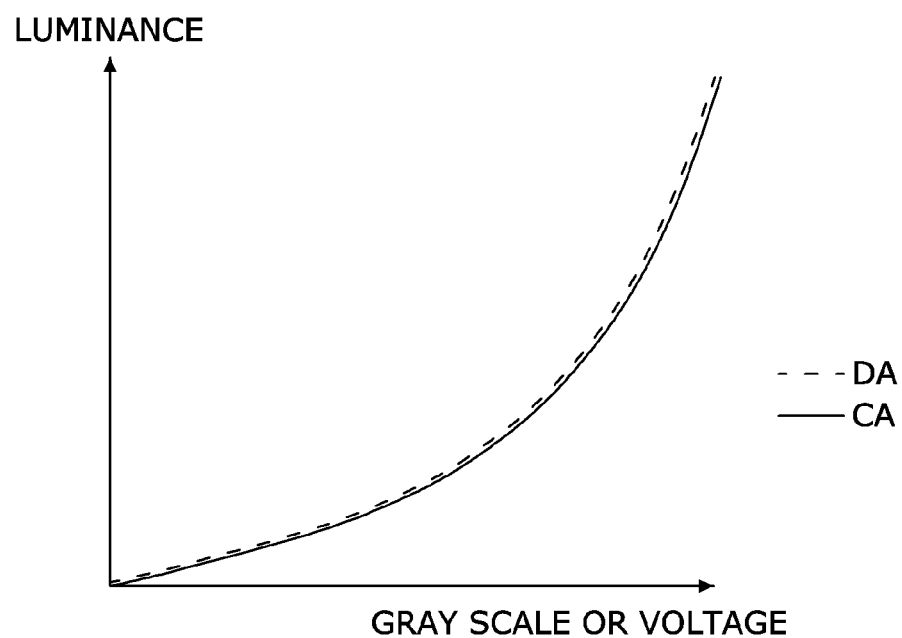
FIG. 14 is a diagram showing a gamma curve in which luminance is equally defined in all regions of a screen according to one embodiment.

FIG. 14 is a diagram showing a gamma curve in which luminance is equally defined in all regions of a screen according to one embodiment.

Referring to FIG. 14, the luminance of the first and second pixel regions DA and CA may be equally controlled in order to increase uniformity of luminance over the entire screen. Since the second pixel region CA is a second pixel region, the data voltage may be generated with a higher voltage in order to obtain the same luminance as the first pixel region DA.

In most cases, it is desirable to control the luminance of the second pixel region CA equal to the luminance of the first pixel region DA to control uniformly the image quality over the entire screen. However, if the data voltage is increased to make the luminance of the second pixel region CA equal to the luminance of the first pixel region CA, since the pixels in the second pixel region CA receive more stress than the pixels in the first pixel region CA, the deterioration may proceed faster and power consumption may be increased.

The present disclosure improves pixel lifetime and power consumption of the second pixel region CA by lowering the luminance of the second pixel region CA in a situation where the user does not feel sensitively even if the luminance of the second pixel region CA is low.

Figure 15:
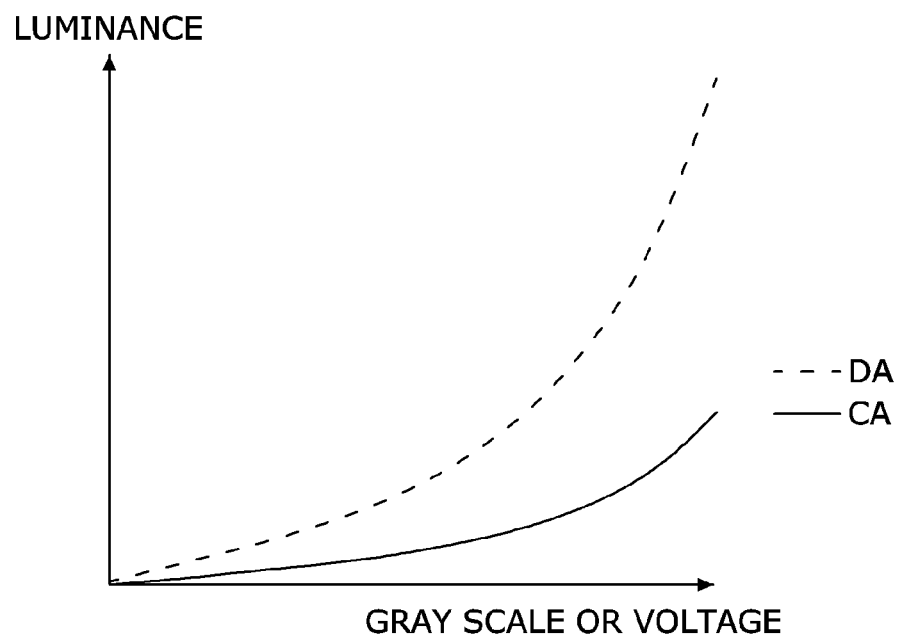
FIGS. 15 to 17 are diagrams showing gamma curves in which luminance of a screen is defined differently for each region according to one embodiment.
Figure 16:
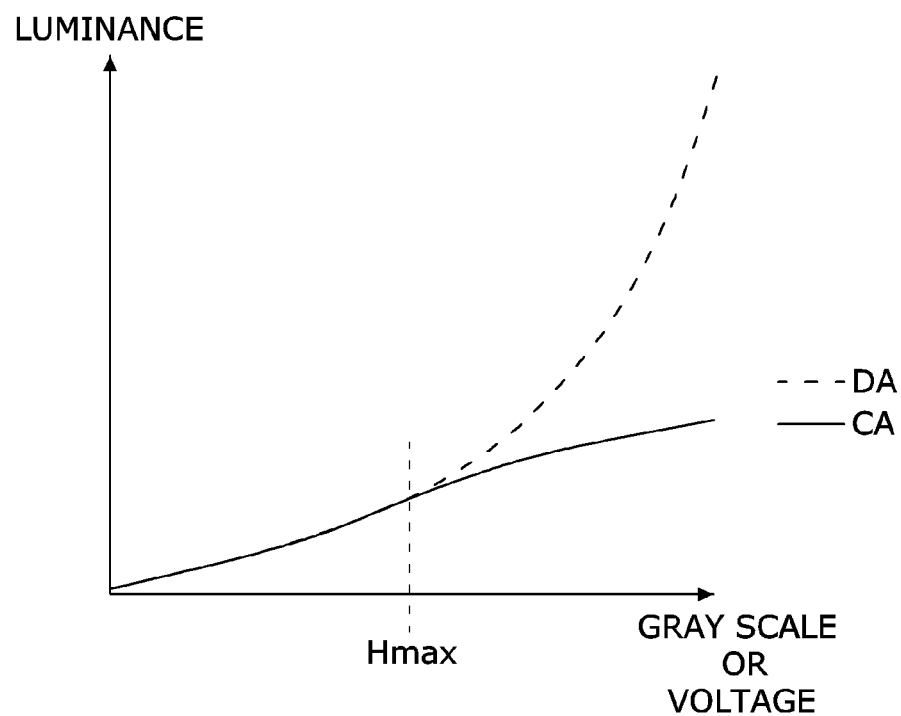
Figure 17:
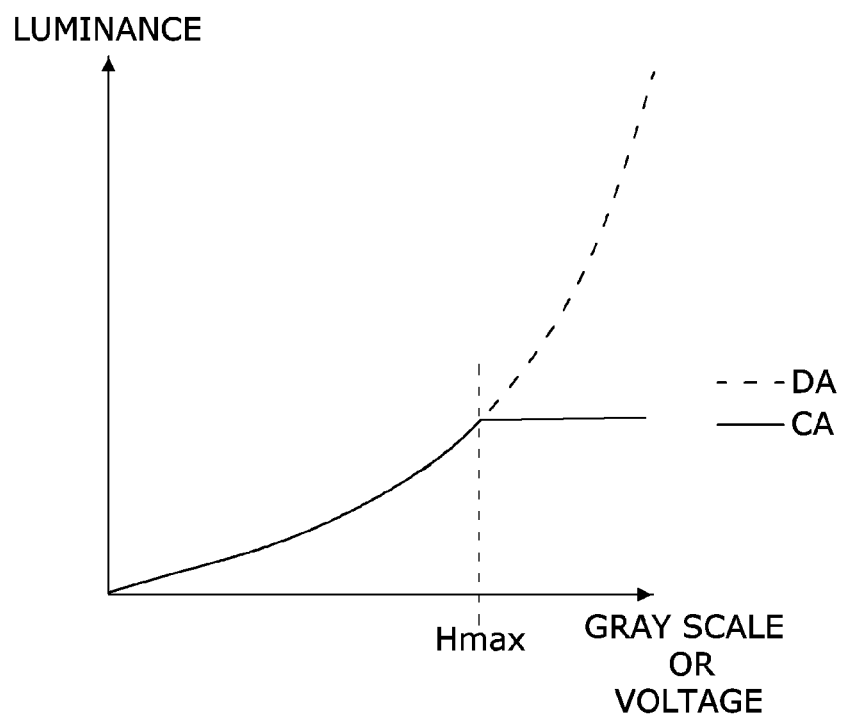

The luminance control device may control the luminance of the second pixel region CA to be lower than that of the first pixel region DA based on at least one of the gamma curves shown in FIGS. 15 to 17 in order to extend the lifetime of pixels of the second pixel region CA and reduce power consumption.

FIGS. 15 to 17 are diagrams showing gamma curves in which luminance of a screen is defined differently for each region according to one embodiment.

Referring to FIG. 15, the luminance of the second pixel region CA may be lower than the luminance of the first pixel region CA at all gray scales except for gray scale 0 (zero). The gray scale 0 is a minimum gray scale value of the black luminance in which the light emitting element is turned off.

Among an image displayed on the screen or an application screen, a touch input generated on the second pixel region CA may be frequently generated. An image currently reproduced on the learning result screen of the AI processor may be predicted as an image in which a touch input of the second pixel region CA is frequently generated. When the mobile terminal rotates from vertical to horizontal, the second pixel region CA may be covered by the user's finger by the user. An image whose image quality is not important may be displayed on the second pixel region CA. For example, in a mobile terminal, a home button, an icon of a fixed application, a forward/backward button, and an option button are less sensitive to luminance degradation. In such a situation, according to the present disclosure, the luminance of the second pixel region CA may be lowered, thereby extending the lifetime of pixels of the second pixel region CA and lowering power consumption without deteriorating the perceived image quality of the user.

According to the present disclosure, the gray scale characteristics of the second pixel region CA may be determined by analyzing pixel data to be written to the pixels of the second pixel region CA every frame. In addition, according to the present disclosure, the gray scale characteristics of the image reproduced on the screen are determined for each frame period, such that the luminance of the second pixel region CA may be controlled to be the same as that of the first pixel region DA in a gray scale less than a specific gray scale Hmax, as shown in FIGS. 16 and 17, while the luminance of the second pixel region CA may be controlled to be lower than that of the first pixel region DA at a specific gray scale Hmax or greater. Here, the specific gray scale Hmax may be varied according to the gray scale characteristics of the second pixel region CA.

Referring to FIGS. 16 and 17, the luminance of the second pixel region CA is controlled equal to the luminance of the first pixel region CA in a gray scale less than a specific gray scale Hmax, and is controlled to be lower than the luminance of the first pixel region DA in a gray scale of a specific gray scale Hmax or greater.

In FIG. 16, inclination of a gamma curve defining luminance of the second pixel region CA in a gray scale equal to or greater than a specific gray scale Hmax is rolled off from the specific gray scale Hmax. In other words, as the inclination of the gamma curve is decreased from the specific gray scale, the luminance of the second pixel region CA may be increased to a low inclination as the gray scale or data voltage increases.

In FIG. 17, a gamma curve defining luminance of the second pixel region CA in a gray scale equal to or greater than a specific gray scale Hmax is saturated to the specific luminance. In other words, the luminance of the second pixel region CA may be fixed to a specific luminance in a gray scale equal to or greater than the specific gray scale.

The luminance of the second pixel region CA may be adaptively selected in FIG. 16 or 17 according to the analysis results of the gray scale characteristics of the input image.

Figure 18:
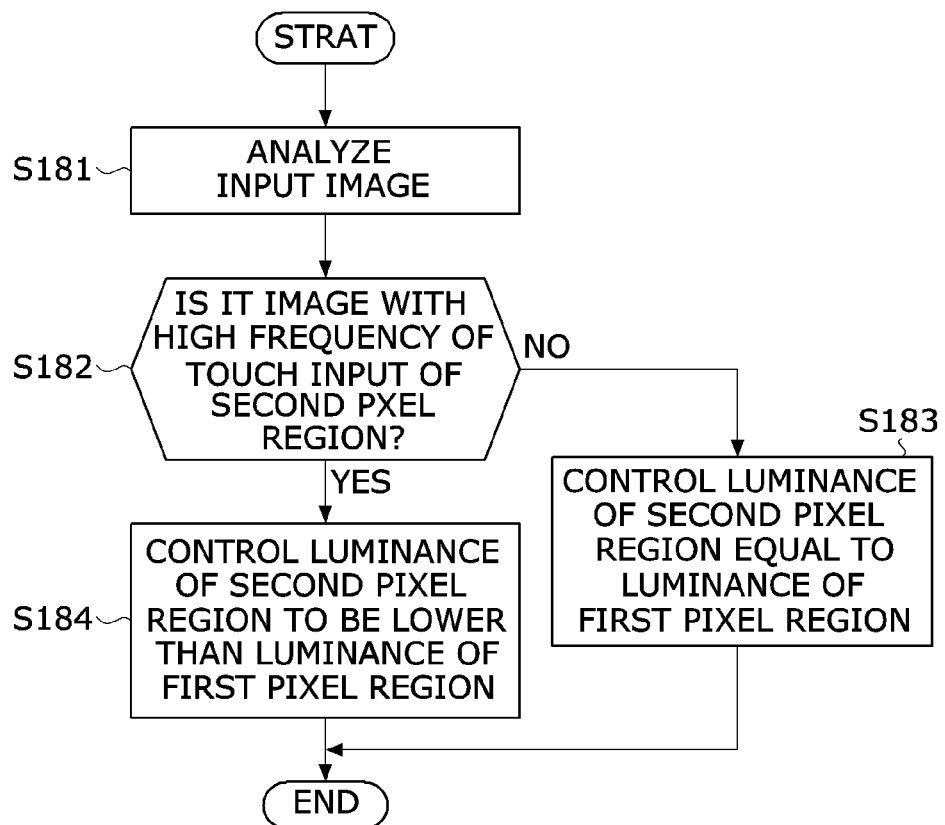
FIG. 18 is a flowchart illustrating a method of controlling luminance of a display device according to a first embodiment of the present disclosure.

FIG. 18 is a flowchart illustrating a method of controlling luminance of a display device according to a first embodiment of the present disclosure. The various embodiments of the following luminance control method may be implemented by the above-described display device, mobile terminal, and luminance control device.

Figure 20:
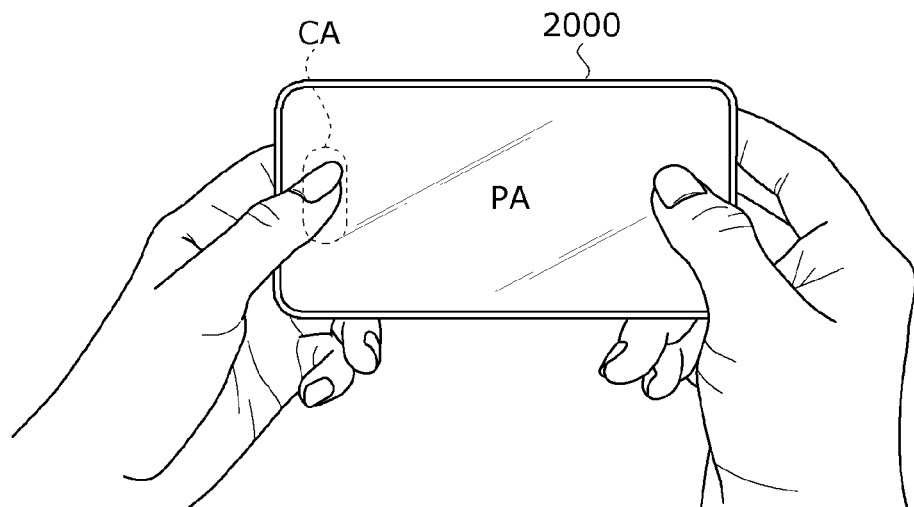
FIG. 20 is a diagram illustrating an example in which a touch input is generated in a second pixel region in a mobile terminal according to one embodiment.

Referring to FIG. 18, the luminance control method may analyze an input image and determine whether a touch input of the second pixel region CA is frequently generated or an image is a predicted application image (S181 and S182). In this step, the AI processor may predict whether or not an image in which a touch input may be frequently generated in the second pixel region CA. For example, in the case of a game, YouTube, or real-time video streaming, the user may view the screen of the mobile terminal 2000 horizontally and hold both sides of the mobile terminal with both hands as shown in FIG. 20. In this case, the second pixel region CA may be frequently touched by the finger or may be covered by the finger.

In the luminance control method, when an image with little or no touch input or an image predicted as such is input on the second pixel region CA, the luminance of the second pixel region CA is controlled equal to the luminance of the first pixel region DA (S182 and S183). In this case, the luminance control method may control luminance of the first and second pixel regions DA and CA based on the gamma curve shown in FIG. 14.

The luminance control method controls the luminance of the second pixel region CA to be lower than the luminance of the first pixel region DA when a touch input is frequently generated on the second pixel region CA or an image of a predicted application is input (S182 and S184). In this case, the luminance control method may control the luminance of the second pixel region CA based on the gamma curve selected from FIGS. 15 to 17 or control the luminance of the second pixel region CA by adaptively applying two or more gamma curves shown in FIGS. 15 to 17 according to the gray scale characteristics of the input image. For example, the luminance control method may control luminance of the second pixel region CA based on the gamma curve shown in FIG. 16, when pixel data of a medium gray scale image with many medium gray scale pixel data (hereinafter referred to as "medium gray scale image") is input, in the pixel data to be written to the pixels of the second pixel region CA. The luminance control method may control luminance of the second pixel region CA based on the gamma curve shown in FIG. 15 or 16, when pixel data of a low gray scale image with many low gray scale pixel data (hereinafter referred to as "low gray scale image") is input, in the pixel data to be written to the pixels of the second pixel region CA.

Figure 19:
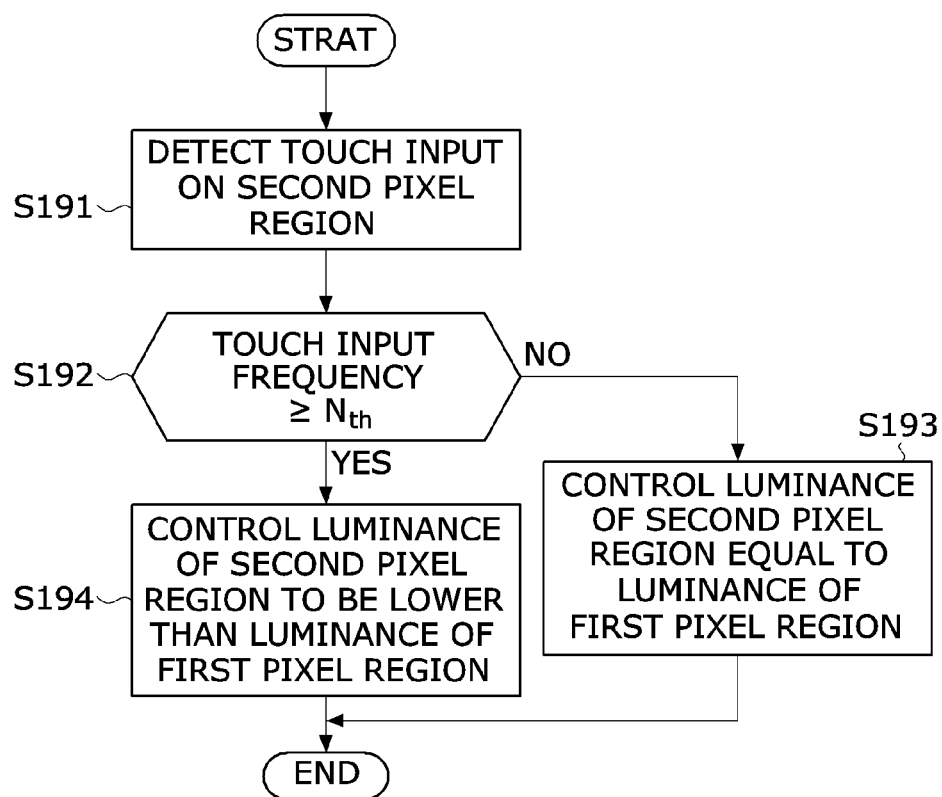
FIG. 19 is a flowchart illustrating a method of controlling luminance of a display device according to a second embodiment of the present disclosure.

FIG. 19 is a flowchart illustrating a method of controlling luminance of a display device according to a second embodiment of the present disclosure.

Referring to FIG. 19, in the luminance control method, a touch input of the second pixel region CA is detected and the frequency is compared with a preset threshold Nth (S191 and S192).

The luminance control method controls the luminance of the second pixel region CA equal to the luminance of the first pixel region DA when the frequency of the touch input detected on the second pixel region CA within the reference time is less than the threshold value (S192 and S193). In this case, the luminance control method may control luminance of the first and second pixel regions DA and CA based on the gamma curve shown in FIG. 14.

In the luminance control method, as shown in FIG. 20, when the frequency of the touch input on the second pixel region CA within a reference time is greater than or equal to the threshold value Nth, the luminance of the second pixel region CA is controlled to be lower than that of the first pixel region DA (S192 and S194). In this case, the luminance control method may control the luminance of the second pixel region CA based on the gamma curve selected from FIGS. 15 to 17 or control the luminance of the second pixel region CA adaptively applying two or more gamma curves shown in FIGS. 15 to 17 according to the gray scale characteristics of the input image. For example, the luminance control method may control luminance of the second pixel region CA based on the gamma curve shown in FIG. 16 when the image to be displayed in the second pixel region CA is a medium gray scale image. In the luminance control method, when the image to be displayed in the currently input second pixel region CA is pixel data of a low gray scale image, the luminance of the second pixel region CA may be controlled based on the gamma curve shown in FIG. 15 or 17.

Figure 21:
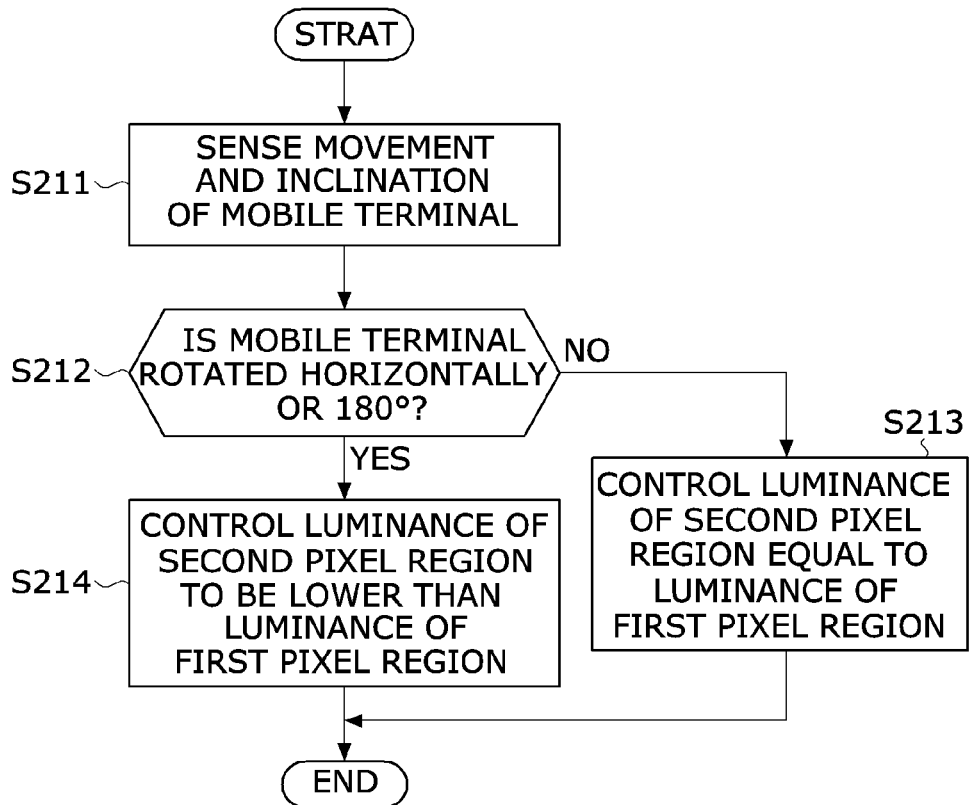
FIG. 21 is a flowchart illustrating a method of controlling luminance of a display device according to a third embodiment of the present disclosure.

FIG. 21 is a flowchart illustrating a method of controlling luminance of a display device according to a third embodiment of the present disclosure.

Referring to FIG. 21, the luminance control method senses movement and inclination of the mobile terminal 2000 in real time to determine whether the mobile terminal 2000 is horizontally or vertically reversed (rotated by 180°) (S211 and S212).

In the luminance control method, when the mobile terminal 2000 is not rotated and the second pixel region CA is positioned at the top of the screen, the luminance of the second pixel region CA is controlled in the same manner as the luminance of the first pixel region DA(S211 and S213). If it is positioned at the top of the screen of the second pixel region CA, the user may easily recognize the change in luminance of the second pixel region CA. Accordingly, when the mobile terminal 2000 does not rotate and the second pixel region CA is positioned at the top of the screen, the luminance of the second pixel region CA is controlled to be the same as the luminance of the first pixel region DA.

Figure 22:
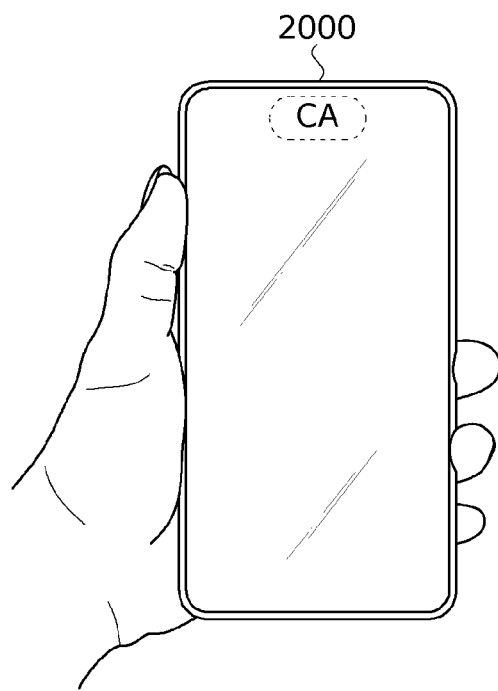
FIG. 22 is a diagram illustrating an example in which a mobile terminal is rotated in a horizontal direction according to one embodiment.
Figure 22:
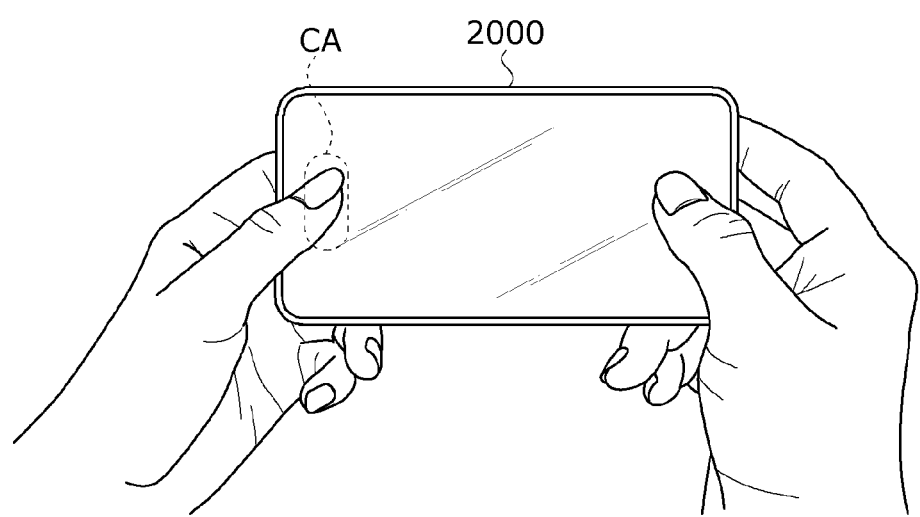
Figure 23:
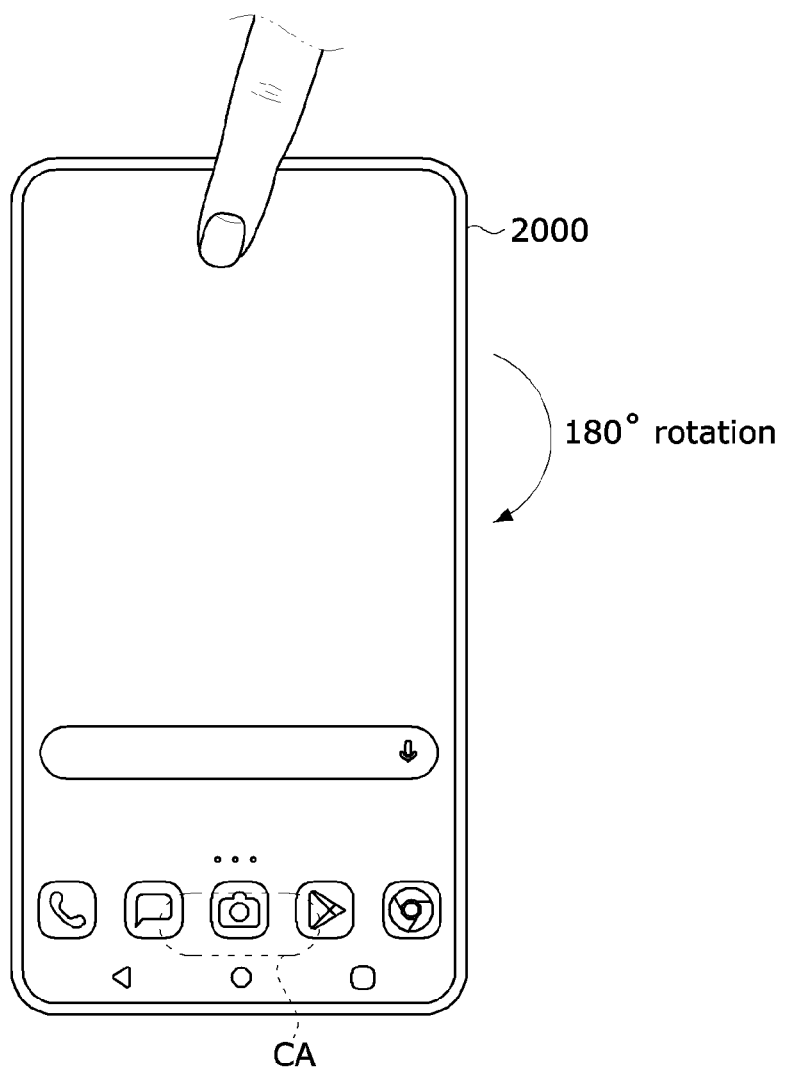
FIG. 23 is a diagram illustrating an example in which a mobile terminal is rotated in a vertical reversal according to one embodiment.

In the luminance control method, as shown in FIG. 22, when the mobile terminal 2000 is rotated horizontally, the second pixel region CA positioned on the top of the screen is touched or covered with a finger, and then when it is rotated by 180° and inverted vertically as shown in FIG. 23, a home button that is not sensitive to image quality and an icon of a fixed application are displayed in the second pixel region CA. Therefore, in this case, the luminance control method controls the luminance of the second pixel region CA to be lower than that of the first pixel region DA (S212 and S214). In this case, the luminance control method controls the luminance of the second pixel region CA based on the gamma curve selected from FIGS. 15 to 17 or control the luminance of the second pixel region CA by adaptively applying two or more gamma curves shown in FIGS. 15 to 17 according to the gray scale the characteristics of the input image. For example, in the luminance control method, when pixel data to be written to the pixels of the second pixel region CA that is currently input is a medium gray scale image, the luminance of the second pixel region CA may be controlled based on the gamma curve shown in FIG. 16. In the luminance control method, when the pixel data to be written in the pixels of the second pixel region CA that is currently input is the pixel data of the low gray scale image, the luminance of the second pixel region CA may controlled based on the gamma curve shown in FIG. 15 or 17.

Meanwhile, a UI screen such as a home button and a fixed application icon may be disposed in the second pixel region CA as shown in FIG. 23 according to a user's setting.

Figure 24:
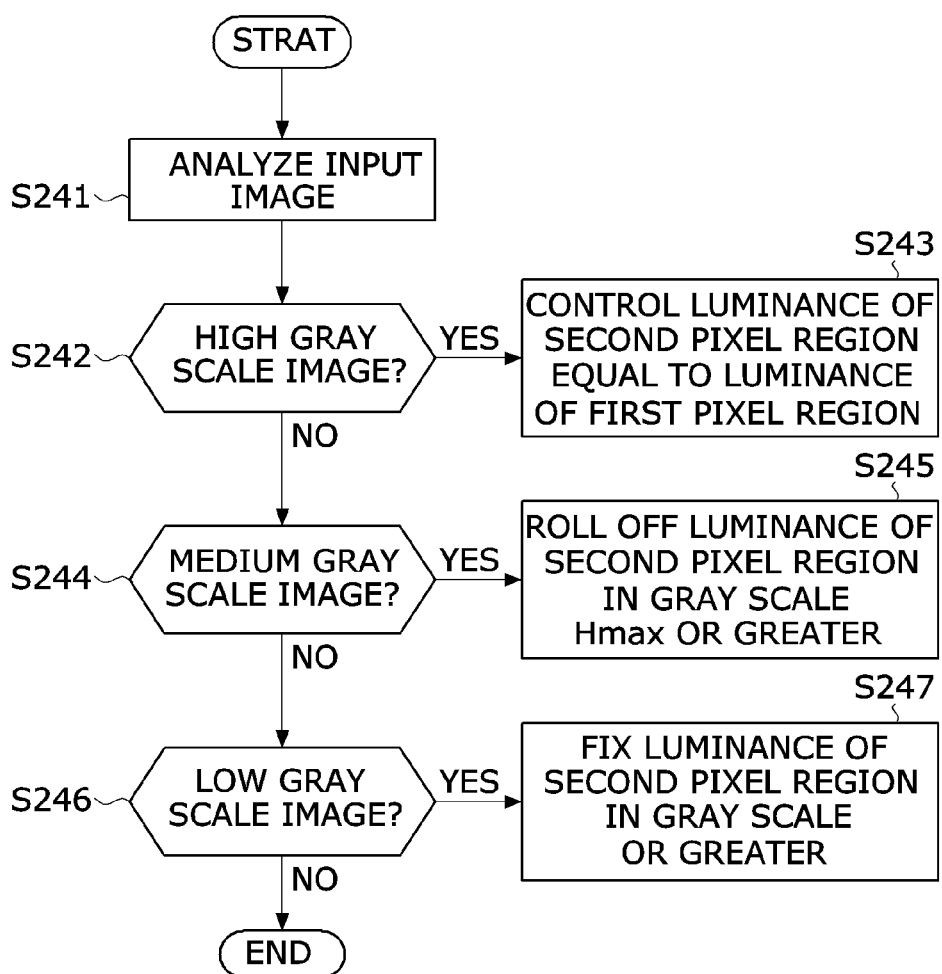
FIG. 24 is a flowchart illustrating a method of controlling luminance of a display device according to a fourth embodiment of the present disclosure.

FIG. 24 is a flowchart illustrating a method of controlling luminance of a display device according to a fourth embodiment of the present disclosure. FIG. 25 is a diagram illustrating an example of a histogram showing a gray scale characteristic of an input image.

Figure 25A:
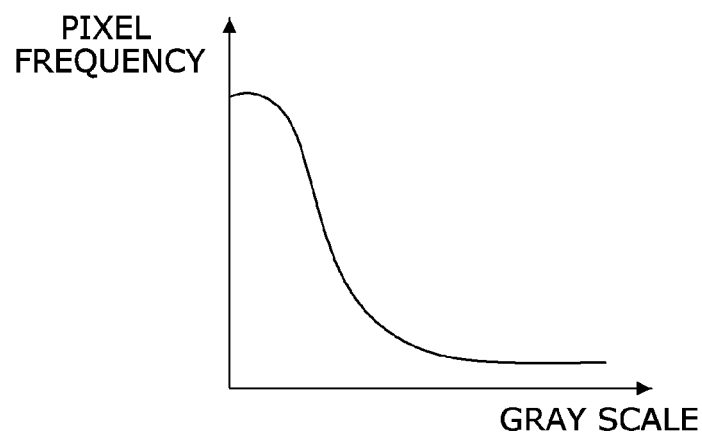
FIGS. 25A, 25B, and 25C are diagrams illustrating an example of histograms showing gray scale characteristics of an input image.
Figure 25B:
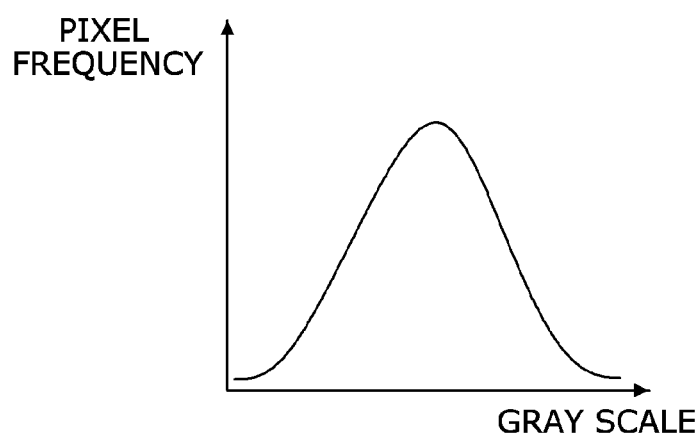
Figure 25C:
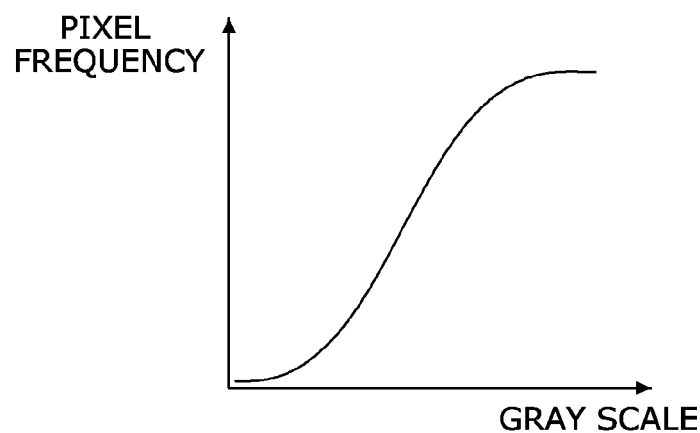

Referring to FIGS. 24 and 25, the luminance control method analyzes gray scale characteristics of the second pixel region CA (S241). As an example, the luminance control method may determine gray scale characteristics of the second pixel region CA by accumulating pixel data to be written in pixels of the second pixel region CA for each gray scale during each frame period. FIG. 25A is an example of a low gray scale image in which the accumulated value of the low gray scale is large in the histogram. FIG. 25B is an example of a medium gray scale image in which the accumulated values of the middle gray scale are large in the histogram. FIG. 25C is an example of a high gray scale image in which the accumulated value of the low gray scale is large in the histogram.

In the luminance control method, when the image to be displayed in the second pixel region CA is the high gray scale image, the luminance of the second pixel region CA is controlled to be the same as the luminance of the first pixel region DA (S242 and S243).

In the luminance control method, when the image to be displayed in the second pixel region CA is the low gray scale image, the luminance of the second pixel region CA is controlled to be lower than the luminance of the region DA in at least some gray scales based on the gamma curves shown in FIGS. 15 to 17 (S244 to S247). In the luminance control method, the luminance of the second pixel region CA in a low gray scale image may be rolled off in a specific gray scale Hmax or greater to control the luminance lower than that of the first pixel region DA as shown in FIG. 16 (S244, S245). In the luminance control method, the luminance of the second pixel region CA in the low gray scale image is saturated in a gray scale of a specific gray scale Hmax or greater, and fixed to a specific luminance, such that the luminance may be controlled lower than that of the first pixel region DA (S246 and S247). The specific gray scale Hmax may be varied according to the gray scale characteristics of the input image.

The luminance control method illustrated in FIG. 24 may be applied when the number of touch inputs on the second pixel region CA is less than a threshold value, but is not limited thereto.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:
1. A display device comprising:
   a display panel on which a pixel array including at least a first pixel region and a second pixel region are disposed;
   a touch sensor disposed on the pixel array;

a display panel driver configured to write pixel data of an input image to pixels from the pixel array that are in the first pixel region and the second pixel region;

a touch sensor driver configured to drive the touch sensor and detect a touch input on the pixel array to generate touch coordinate data; and a luminance control device configured to lower a luminance of one of the first pixel region or the second pixel region in at least some gray scales when the touch input is detected on the pixel array, wherein the luminance control device is configured to lower the luminance of the second pixel region when the touch input is detected on the second pixel region.

2. The display device of claim 1, wherein a pixels per inch (PPI) of the second pixel area is less than a PPI of the first pixel area.

3. The display device of claim 2, wherein the touch sensor driver is configured to transmit luminance control data for controlling the luminance of the second pixel region to the luminance control device.

4. The display device of claim 3, wherein the luminance control data includes frequency data indicating a number of touch inputs generated on the second pixel region, and touch coordinate data for touch inputs in the second pixel region.

5. The display device of claim 1, wherein the luminance control device is configured to control the luminance of the second pixel region to be less than a luminance of the first pixel region when a number of the touch inputs on the second pixel region is greater than or equal to a preset threshold within a predetermined reference time.

6. A mobile terminal comprising:

a display panel in which a pixel array including at least a first pixel region and a second pixel region are disposed;

a touch sensor disposed on the pixel array;

a display panel driver configured to write pixel data of an input image to pixels from the pixel array that are in the first pixel region and the second pixel region;

a touch sensor driver configured to drive the touch sensor and detect a touch input on the pixel array to generate touch coordinate data;

a sensor configured to sense changes in movement and inclination in real time;

a host system connected to the sensor and configured to transmit the pixel data of the input image to the display panel driver, and to receive the touch coordinate data from the touch sensor driver; and a luminance control device configured to lower a luminance of one of the first pixel region or the second pixel region in at least some gray scales when the touch input is detected on the pixel array, wherein the luminance control device is configured to lower the luminance of the second pixel region when the touch input is detected on the second pixel region.

7. The mobile terminal of claim 6, wherein a pixels per inch (PPI) of the second pixel area is less than a PPI of the first pixel area.

8. The mobile terminal of claim 6, wherein the luminance control device is configured to lower the luminance of one of the first pixel region or the second pixel region having a lower pixels per inch (PPI) when a number of the touch input is greater than or equal to a preset threshold within a predetermined time.

9. The mobile terminal of claim 6, wherein the luminance control device is configured to lower one of the first pixel region or the second pixel region having a lower pixels per inch (PPI) in a gray scale equal to or greater than a specific gray scale of a maximum frequency among gray scale values of pixel data to be written to pixels of the pixel region having the lower PPI.

* * * * *